(12) United States Patent
Watanabe et al.

(10) Patent No.: US 6,501,729 B2
(45) Date of Patent: Dec. 31, 2002

(54) CARTRIDGE FOR INFORMATION-RECORDING MEDIA HAVING DEFORMABLE ELASTIC PRESSING MEMBER URGED BY PROJECTION ON SHUTTER

(75) Inventors: Hitoshi Watanabe, Ibaraki (JP); Yoshitane Tsuburaya, Ibaraki (JP); Katsusuke Shimazaki, Ibaraki (JP); Satoru Ohnuki, Toride (JP); Norio Ohta, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/000,400

(22) Filed: Dec. 4, 2001

(65) Prior Publication Data

US 2002/0048257 A1 Apr. 25, 2002

Related U.S. Application Data

(62) Division of application No. 09/100,111, filed on Jun. 19, 1998, now Pat. No. 6,339,583.

(30) Foreign Application Priority Data

Jun. 20, 1997 (JP) .............................. 9-164245

(51) Int. Cl.[7] .............................. G11B 3/70; G11B 5/84; G11B 7/26
(52) U.S. Cl. ...................................... 369/291
(58) Field of Search ................................ 369/291, 288, 369/289, 272; 360/131, 132, 133

(56) References Cited

U.S. PATENT DOCUMENTS

| | | | |
|---|---|---|---|
| 4,803,678 A | 2/1989 | Tanaka et al. | 369/291 |
| 4,817,079 A | 3/1989 | Covington | 369/291 |
| 5,650,899 A | 7/1997 | Schick et al. | 360/133 |
| 5,974,026 A | 10/1999 | Guerini | 369/291 |
| 6,147,962 A * | 11/2000 | Srinivasan et al. | 360/133 |
| 6,304,417 B1 * | 10/2001 | Bracken et al. | 360/133 |

* cited by examiner

*Primary Examiner*—Hoa T. Nguyen
*Assistant Examiner*—Julie Anne Watko
(74) *Attorney, Agent, or Firm*—Birch, Stewart, Kolasch & Birch, LLP

(57) ABSTRACT

A plate spring is provided on a back surface of a shutter of a cartridge. When the shutter is closed, the plate spring presses a disk in a cartridge case against an inner wall surface of a lower case so that the disk is immovable in the case. When the shutter is open, the plate spring is retracted into a space between an inner surface of the shutter and a surface of an upper case. The disk is supported immovably and uniformly in the cartridge. Therefore, deformation such as warpage of the disk hardly occurs. Even when the cartridge is stored in any posture, it is possible to avoid deformation such as warpage and flexure of the disk in the cartridge during the storage.

14 Claims, 26 Drawing Sheets

Fig. 2A
Fig. 2B
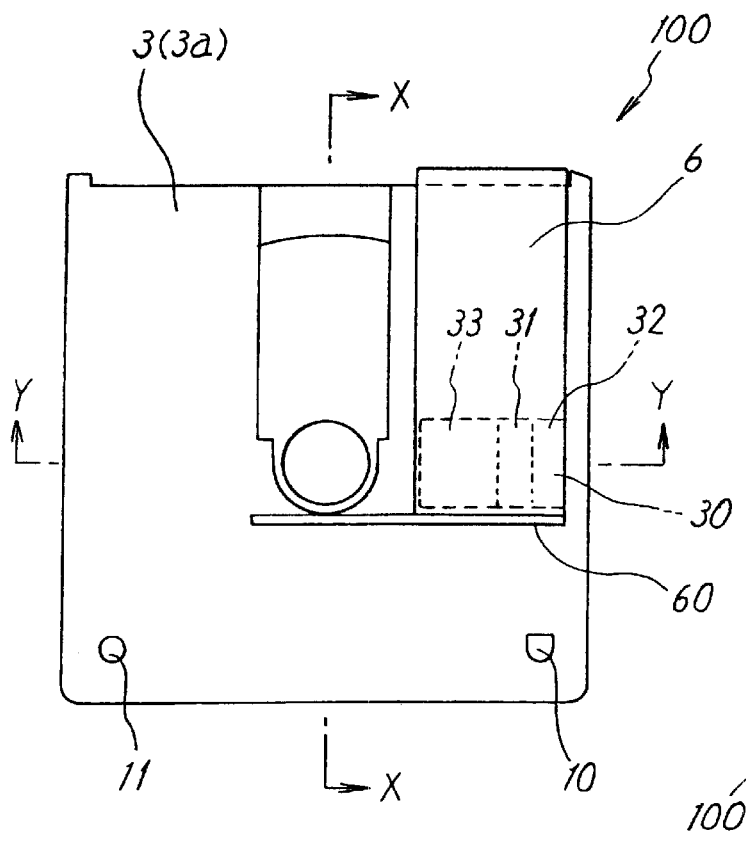
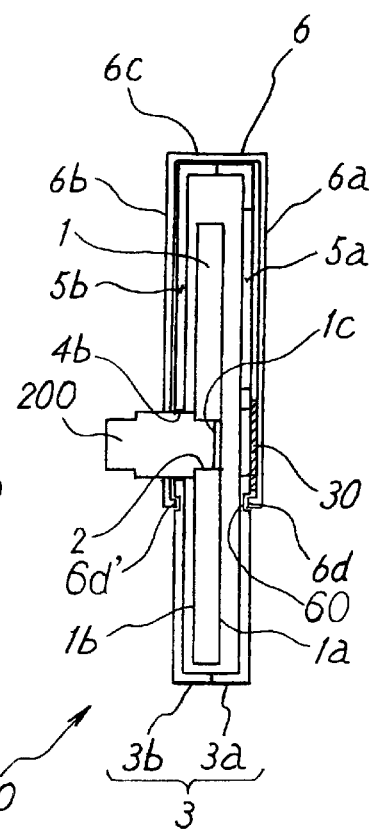
Fig. 2C
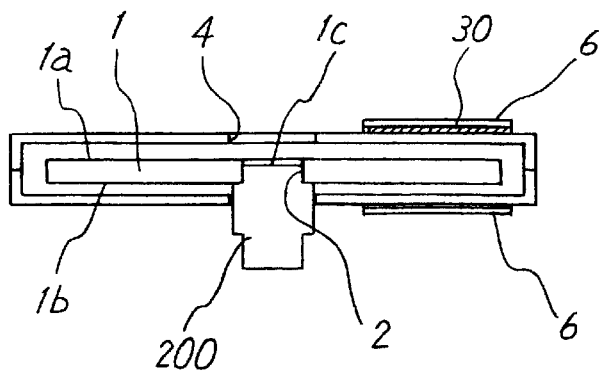

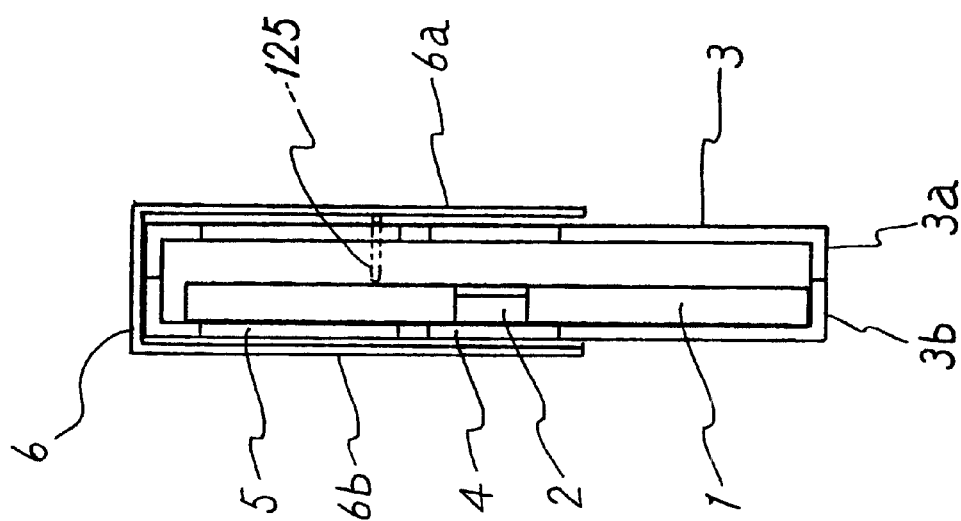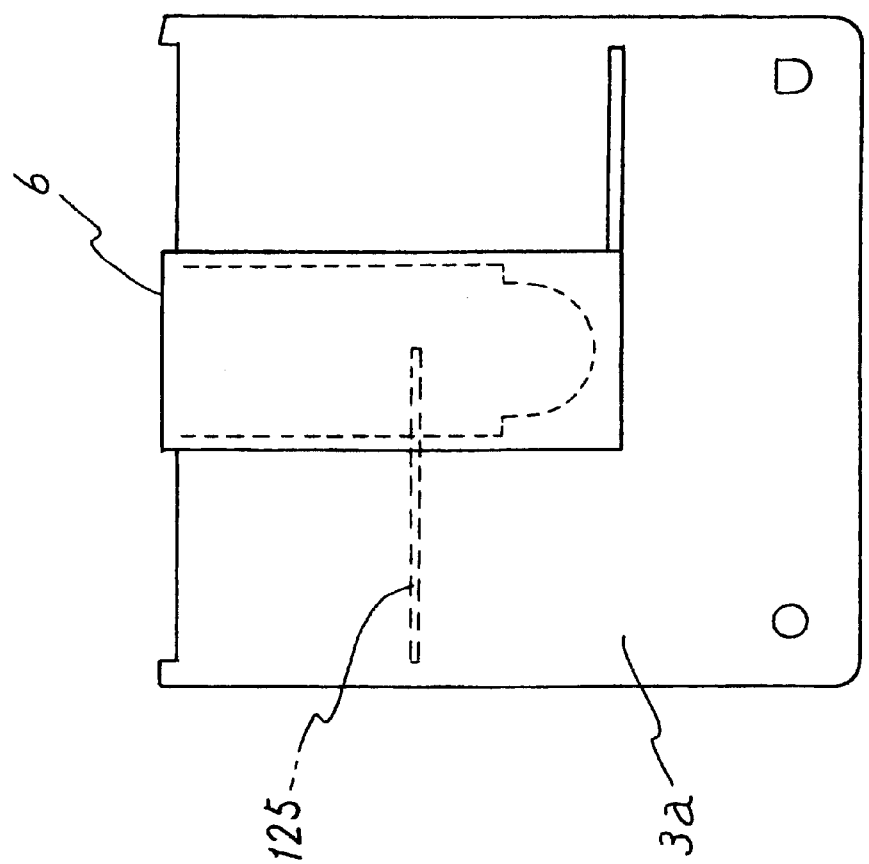

CARTRIDGE FOR INFORMATION-RECORDING MEDIA HAVING DEFORMABLE ELASTIC PRESSING MEMBER URGED BY PROJECTION ON SHUTTER

This application claims priority to U.S. application Ser. No. 09/100,111 filed Jun. 19, 1998, now U.S. Pat. No. 6,339,583.

BACKGROUND OF THE INVENTION

1. Field of the Invention

The present invention relates to a structure of a cartridge for accommodating an information-recording medium including a substrate made of resin or plastic. In particular, the present invention relates to a cartridge which makes it possible to avoid deformation during storage of an information-recording medium such as an optical recording medium and a magnetic recording medium accommodated in the cartridge.

2. Description of Related Art

Recently, a variety of high density information-recording media are commercially available, which are represented by compact disks (CD), magneto-optical recording media (MO), optical recording media such as digital versatile disks (DVD), and magnetic recording media such as hard disks. Usually, a substrate made of plastic such as polycarbonate is used for the optical recording media. Even in the case of the hard disk, it is known to use a plastic substrate formed with emboss type pre-pits. Since the injection molding is available to produce the plastic substrate, the plastic substrate is suitable for mass-production. However, in view of the properties of the plastic substrate, the plastic substrate involves a problem that deformation such as warpage and flexure tends to occur as compared with substrates made of aluminum or glass.

A permissible standard value is specified for the optical disk in relation to the deformation such as warpage. For example, in the case of a rotary type recording disk of 5.25 inches (133 mm), the permissible standard value for the amount of disk deformation is determined as a tilt in a direction toward the outer circumferential end from the center of rotation of the disk, which is not more than ±(diameter of disk recording medium)×sin((0.5 to 0.6)×2π/360), i.e., not more than about 0.58 to 0.70 mm.

If the deformation of not less than about 0.58 to 0.70 mm occurs, for example, in the optical disk or the magneto-optical disk of 5.25 inches (133 mm), the following trouble is caused. For example, when a magneto-optical disk having a diameter of 5.25 inches and a thickness of 0.6 mm is accommodated in a cartridge, a space of a slight width of 1.5 to 1.7 mm exists between the surface of the magneto-optical disk and the inner wall of the cartridge. Therefore, when the disk having the radius of 67 mm is rotated, if the value of surface deflection caused by deformation of the disk becomes not less than 1.5 to 1.7 mm concerning one side (not less than 3.6 to 4.0 mm concerning both sides) in a direction perpendicular to the disk surface, then the disk collides with the cartridge, and the disk is possibly destroyed. It is also feared that the surface deflection may cause collision between the disk and the optical head or the magnetic head of the recording and reproducing apparatus during rotation of the disk, resulting in breakage of the disk or the head. Therefore, the deformation of the substrate relates to an extremely serious problem concerning the information-recording medium on which recording or reproduction is performed while accommodating the information-recording medium in a case or a cartridge.

For example, FIG. 25A shows a state in which a cartridge case 73 is allowed to stand perpendicularly, wherein a disk 1 produced with a plastic substrate is accommodated in the cartridge case 73. In order to successfully rotate the disk 1 in the cartridge for the purpose of recording or reproduction, a gap is provided between the inner wall of the cartridge case 73 and the surface of the disk 1. Therefore, as shown in FIG. 25A, the disk 1 leans obliquely against the inner wall in the cartridge case 73 which stands perpendicularly. In such an arrangement, for example, if the disk 1 is left for a long period of time in a situation in which the maximum temperature is not less than 40° C. and the maximum humidity arrives at 90% RH, the warpage 14 occurs in the vicinity of the outer circumference of the disk 1 as shown in FIG. 25B.

As shown in FIG. 26A, if the cartridge case 73 is left to lean against the wall under a similar environmental condition, the warpage 14 occurs in the vicinity of the outer circumference of the disk 1 as shown in FIG. 26B.

As shown in FIGS. 27A and 27B, it is assumed that a disk recording medium 1 is placed and stored in a cartridge 73 which has a stud 13 only at its inner circumferential portion. When the disk is thin, and the diameter of the stud 13 is small as compared with the diameter of the disk, then the warpage 14 has sometimes occurred at the outer circumference of the disk 1 as shown in FIG. 27B. When such a cartridge 73 is left to lean obliquely against a perpendicular wall, if the environmental temperature and the environmental humidity are severe as described above, the deformation 14 of the disk 1 has occasionally occurred as shown in FIG. 28.

Even in the case of a conventional disk produced by using a substrate made of resin such as polycarbonate and polymethyl methacrylate, when the disk has a large diameter, it is possible to counteract the deformation such as warpage by using a thick resin substrate. In the market, for example, the following characteristics are demanded for the medium at present and in future: i) the information-recording density is extremely high, ii) the dimension such as diameter and thickness is smaller, iii) the medium has a light weight and it is hardly broken, and iv) the medium is usable at high speed rotation. In order to satisfy the foregoing demands, for example, it is necessary for the magneto-optical disk that the thickness of the plastic substrate such as polycarbonate and polymethyl methacrylate is not more than 0.8 mm, especially not more than 0.6 mm. However, if the thickness of the plastic substrate is made thin as described above, the problem of deformation such as warpage becomes conspicuous.

In general, the warpage of the disk occurs when the medium is stored or used in an environment which is different from the environment of temperature and humidity during the production of the recording medium. It has been revealed that the larger the difference in environment is, the more conspicuous the warpage is. The magnitude of warpage differs depending on the difference in type of the plastic material of the substrate. It has been also revealed that the magnitude of warpage differs depending on the type and the thickness of the material for a protective film for coating the substrate.

SUMMARY OF THE INVENTION

A first object of the present invention is to provide a novel cartridge for accommodating an information-recording medium based on the use of a plastic substrate, which makes it possible to avoid any deformation such as warpage and flexure of the recording medium in the cartridge during storage even when the cartridge is stored in any posture.

A second object of the present invention is to provide a novel cartridge which makes it possible to avoid any deformation such as warpage and flexure of a recording medium as accommodated obliquely therein even when the cartridge is left to stand perpendicularly or even when the cartridge is left to lean against a wall.

A third object of the present invention is to provide a novel cartridge for accommodating an information-recording medium based on the use of a plastic substrate, in which the cartridge is prevented from such an arrangement that the cartridge stands perpendicularly or the cartridge leans against a wall.

According to a first aspect of the present invention, there is provided a cartridge for accommodating an information-recording medium, comprising:

a cartridge case on which a window for accessing the information-recording medium in the cartridge is formed;

a shutter used for opening and closing the window; and a deformable elastic member provided on an inner surface of the shutter, for making contact with the information-recording medium accommodated in the cartridge case so that the information-recording medium is fixed in the cartridge case when the shutter is closed, wherein at least a part of the deformable elastic member is retracted into a space between the inner surface of the shutter and a surface of the cartridge case when the shutter is open.

The cartridge of the present invention functions such that when the shutter is closed, the information-recording medium such as a magneto-optical disk is pressed in the cartridge case by means of the elastic member provided on the inner surface of the shutter. Accordingly, for example, even when the user arranges the cartridge in a state in which the cartridge stands perpendicularly as shown in FIG. 25A or in a state in which the cartridge leans against the wall surface as shown in FIG. 26A, the information-recording medium is fixed by the elastic member in the cartridge as shown in FIG. 1C. Therefore, the information-recording medium is prevented from movement in the cartridge, which would otherwise result in a posture liable to cause deformation such as warpage and flexure. Even when the cartridge is vibrated, it is impossible for the information-recording medium to move in the cartridge. Therefore, any damage of the information-recording medium is avoided, which would be otherwise caused by collision of the information-recording medium with the inner wall of the cartridge.

Especially, the elastic member urges the information-recording medium accommodated in the cartridge case so that the information-recording medium is pressed against the inner wall of the cartridge case. Therefore, no partial load is exerted on the outer circumferential portion of the information-recording medium. Even when the cartridge is left to stand perpendicularly or obliquely for a long period of time, the deformation does not occur in the information-recording medium, which would be otherwise caused by warpage and flexure.

When the shutter is open, at least the part of the elastic member is retracted into the space between the inner surface of the shutter and the surface of the cartridge case. Therefore, the elastic member does not inhibit the rotational motion of the information-recording medium as well as the recording or reproducing operation accompanied thereto. The elastic member may have a shape of plate or wire. When a plate spring is used as the elastic member, the entire plate spring may be retracted into the space between the inner surface of the shutter and the surface of the cartridge case when the shutter is open. Accordingly, it is possible to produce the compact cartridge while giving the effect of the present invention which is provided when the shutter is closed as described above. The cartridge of the present invention has exactly the same appearance as those of conventional cartridges, while avoiding the warpage and flexure of the information-recording medium.

The window may include a pair of window openings which are formed through both surfaces of the cartridge case so that the information-recording medium is accessible from both sides of the cartridge case. The shutter may include a pair of shutter planes used for opening and closing the pair of window openings. The elastic member may be provided on each of inner surfaces of the shutter planes so that the information-recording medium may be interposed and fixed between the elastic members in the cartridge case.

The elastic member may be a wire spring. One end of the wire spring may be secured to the inside of the cartridge case, and the other end may be secured to the inner surface of the shutter. The wire spring is bent so that its bent section urges the information-recording medium against an inner wall of the cartridge case when the shutter is closed, and a part of the wire spring is retracted into the space between the inner surface of the shutter and the surface of the cartridge case when the shutter is open.

According to a second aspect of the present invention, there is provided a cartridge for accommodating an information-recording medium, comprising:

a cartridge case on which a window for accessing the information-recording medium in the cartridge is formed;

a shutter used for opening and closing the window, the shutter having a projection provided on its inner surface; and a pressing member supported in the cartridge case to be capable of elastic deformation, for being urged by the projection to press the information-recording medium so that the information-recording medium is fixed in the cartridge case when the shutter is closed, wherein the pressing member is disengaged from the information-recording medium when the shutter is open.

According to the cartridge concerning this aspect, the projection, which is provided on the inner surface of the shutter, urges the pressing member when the shutter is closed. The urged pressing member is moved toward the information-recording medium, and it contacts with the information-recording medium so that it presses the information-recording medium. As a result, the information-recording medium is pressed against the inner wall of the cartridge case, and it is fixed in the cartridge (see FIG. 9B). Accordingly, no partial load is exerted on the outer circumferential portion of the information-recording medium. Even when the cartridge is arranged perpendicularly or obliquely for a long period of time, no deformation occurs, which would be otherwise caused by warpage or flexure in the information-recording medium. The damage to the information-recording medium is avoided, which would be otherwise caused by collision of the information-recording medium with the inner wall of the cartridge as described above.

A groove, into which the projection is inserted to slide therein when the shutter is opened, may be formed on the cartridge case. As shown in FIGS. 7A to 7C, a part of the cartridge case may be used to form the pressing member. An area for forming the pressing member may be defined by cutting out a predetermined area (central area 65) of the cartridge case. The pressing member may be defined, for example, by cutting out an area of the cartridge case so that a spindle hole is surrounded thereby. In this embodiment, the pressing member is integrated with the cartridge case. Therefore, it is unnecessary to separately provide any additional member. Thus, the cartridge can be designed in a simple and compact form.

Alternatively, the pressing member may comprise a pressing section for pressing the information-recording medium, and an arm for movably supporting the pressing section in the cartridge case. In a specified embodiment, the pressing section may be supported between a pair of arms, and the pressing section may have a pressing surface for pressing the information-recording medium and a contact surface disposed on a side opposite to the pressing surface, for making contact with the projection (see FIGS. 9A and 9B). When the arm is composed of a plate spring, the amount of movement of the pressing section, which is provided when the shutter is opened and closed, can be adjusted in accordance with the length of the arm. In another specified embodiment, the cartridge may be constructed such that one end of the arm is secured to an inner wall of the cartridge case, the other end of the arm is coupled to the pressing section, a part of the arm is bent to form a protrusion which is convex toward the outside of the cartridge case, and the protrusion is urged by the projection when the shutter is closed (see FIG. 9B).

According to a third aspect of the present invention, there is provided a cartridge for accommodating a planar information-recording medium movably in the cartridge, wherein:

a sliding material is applied to at least a part of an inner wall surface (inner circumferential side wall) of the cartridge opposing to an outer circumference of the information-recording medium in the cartridge, and thereby the outer circumference of the information-recording medium slides easier on the sliding material than on a material for constructing the inner wall surface of the cartridge.

According to the cartridge concerning the third aspect of the present invention, the sliding material is applied to the inner circumferential side wall. Therefore, as shown in FIG. 23A, even when the cartridge is allowed to lean against the wall, the information-recording medium can be moved with its outer circumference sliding on the inner circumferential side wall. As a result, the information-recording medium is positioned in the cartridge so that the whole of one planar surface of the information-recording medium contacts with one inner wall surface of the cartridge opposing to the planar surface of the information-recording medium. Therefore, the information-recording medium is prevented from being arranged in a posture which tends to cause deformation such as warpage and flexure in the cartridge. Those usable as the sliding material include, for example, titanium nitride, silicon nitride, aluminum nitride, silicon carbide, and silicon oxide.

According to a fourth aspect of the present invention, there is provided a cartridge for accommodating a planar information-recording medium movably in a cartridge case, wherein:

a pair of long sides, which define at least one side surface of the cartridge case, are processed to form a curved surface having a curvature of not less than 2 mm (2 mm≦r).

According to a fifth aspect of the present invention, there is provided a cartridge for accommodating a planar information-recording medium movably in a cartridge case, wherein:

at least one side surface is processed to form a curved surface having a curvature of not less than 2 mm.

In the cartridges according to the fourth and fifth aspects of the present invention, the side surface or the portions of the pair of long sides (ridges) for defining the side surface forms the curves surface with the curvature described above. Therefore, it is difficult for the user to leave the cartridge standing perpendicularly or obliquely. It is possible to avoid the posture which causes warpage and flexure of the information-recording medium in the cartridge. The portion, which is processed to have the curvature r, may be coated with a material which causes smooth sliding movement as compared with a material for constructing the cartridge. When the cartridge is formed with a window, and it further comprises a shutter used for opening and closing the window, then a corresponding portion of the shutter, which covers the side surface processed to have the curvature r, may be also processed to have the curvature r.

According to a sixth aspect of the present invention, there is provided a cartridge for accommodating a planar information-recording medium movably in a cartridge case, wherein:

at least a side surface of the cartridge case and a portion in the vicinity thereof are coated with a material which causes smooth sliding movement as compared with a material for constructing the cartridge, and a pair of long side portions of the side surface form a curved surface.

In the cartridge according to the sixth embodiment of the present invention, the side surface of the cartridge case and the portion in the vicinity thereof are coated with the material which causes smooth sliding movement as compared with the material for constructing the cartridge. Therefore, even when it is intended that the side surface of the cartridge case is allowed to contact with the floor or ground to stand the cartridge perpendicularly or obliquely, the cartridge easily slides and falls down to take a horizontal arrangement. Accordingly, the information-recording medium is prevented from being arranged in a posture which causes warpage and flexure in the cartridge. Those used as the material which causes smooth sliding movement include, for example, ceramics such as titanium nitride, metals such as nickel, and resins such as polyacetal and polytetrafluoroethylene.

The cartridge of the present invention may contain the information-recording medium in the cartridge case. The information-recording medium may be an arbitrary recording medium with its substrate made of a plastic material, including, for example, magneto-optical disks, phase-change optical disks, DVD, and removable hard disks.

BRIEF DESCRIPTION OF THE DRAWINGS

FIG. 2A shows a plan view illustrating a state in which the shutter of the cartridge shown in FIG. 1 is open, FIG. 2B shows a longitudinal sectional view in which the cartridge is viewed in a direction of X—X, and FIG. 2C shows a cross-sectional view in which the cartridge is viewed in a direction of Y—Y.

FIG. 20A shows a plan view illustrating a cartridge in which a wire spring is disposed at a position passing through the center of a window, and FIG. 20B shows a longitudinal sectional view in which the cartridge is viewed in a direction of X—X in a plan view corresponding to FIG. 18A.

DESCRIPTION OF THE PREFERRED EMBODIMENTS

In this specification, the term "cartridge" includes the so-called cartridge in the narrow sense for accommodating the information-recording medium, as well as cases, boxes, jackets, and those which resemble them for accommodating information-recording media. The present invention is extremely effective on the cartridge of the type in which the information-recording medium is movably accommodated in the cartridge.

The information-recording medium applied to the cartridge of the present invention may be any one of magneto-optical recording media, phase-change optical recording media, rewritable recording media such as hard disks, write-once type optical recording media such as CD-R, and read-only type recording media such as DVD, CD, and magnetic cards. The shape of the information-recording medium may be any one of rectangular or disk-shaped planar configurations. The structure of the information-recording medium is not specifically limited. For example, any structure is available, which is obtained by stacking arbitrary layers such as a dielectric film, a heat-insulative film layer, a recording layer, a reflective film layer, a protective film layer, and a lubricant layer in an arbitrary order on a resin substrate. The disk-shaped recording medium may have an arbitrary diameter such as 5.25 inches and 3.5 inches having a thickness of, for example, 2.0 mm, 1.5 mm, 1.2 mm, 1.0 mm, 0.8 mm, 0.6 mm, or 0.4 mm. Those usable for the material for the substrate of the recording medium include resins or plastics such as polycarbonate and polymethyl methacrylate.

Arbitrary materials may be used for the material for the cartridge of the present invention, especially for the cartridge case, including, for example, resins, plastics, and ceramics such as hard vinyl chloride resin, polypropylene, polyethylene, ABS resin, polycarbonate, polyacryl methacrylate, and silicon. When the cartridge is provided with a shutter, those usable as the material for the shutter include, for example, stainless steel and aluminum alloy as well as ceramic plates and plastic resin plates such as polypropylene resin, ABS resin, and polycarbonate resin. The shape of the shutter may be processed into, for example, L-shaped configurations and U-shaped or ]-shaped configurations.

Specified embodiments of the cartridge of the present invention will be explained in detail below with reference to the drawings. However, the present invention is not limited to the specified embodiments.

First Embodiment

Figure 1A:
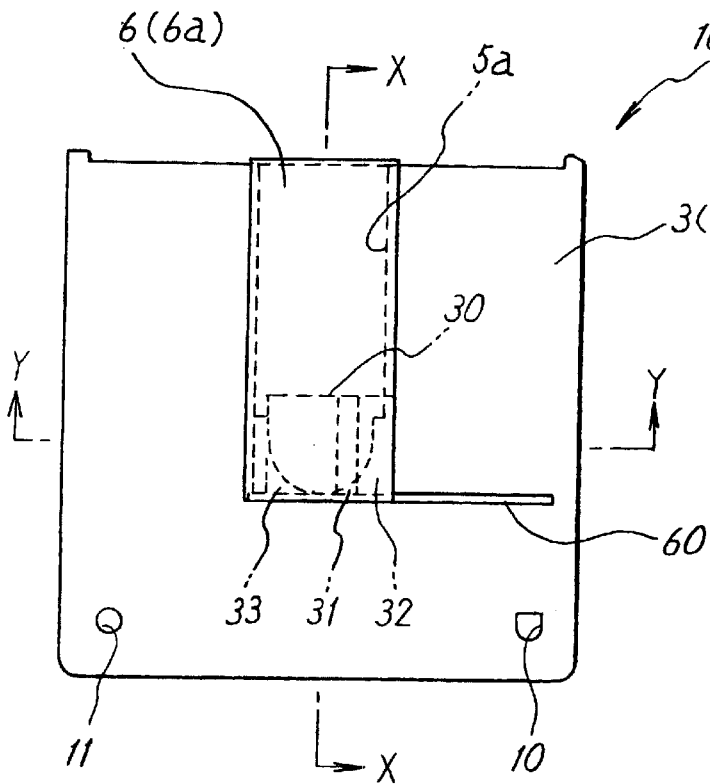
FIG. 1A shows a plan view illustrating a state in which a shutter of a cartridge for accommodating a magneto-optical disk according to the present invention is closed.
Figure 1B:
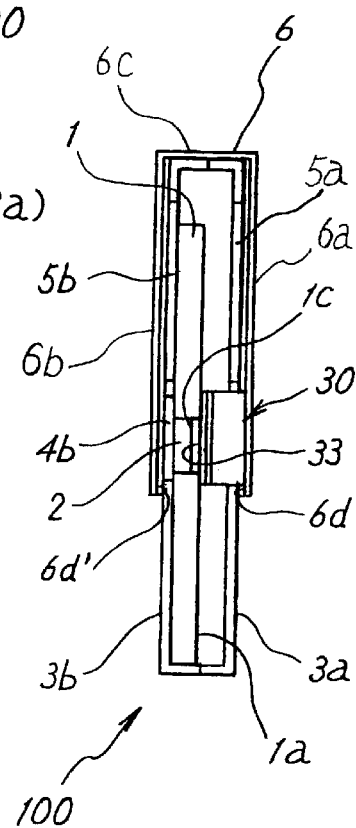
FIG. 1B shows a longitudinal sectional view in which the cartridge is viewed in a direction of X—X.
Figure 1C:
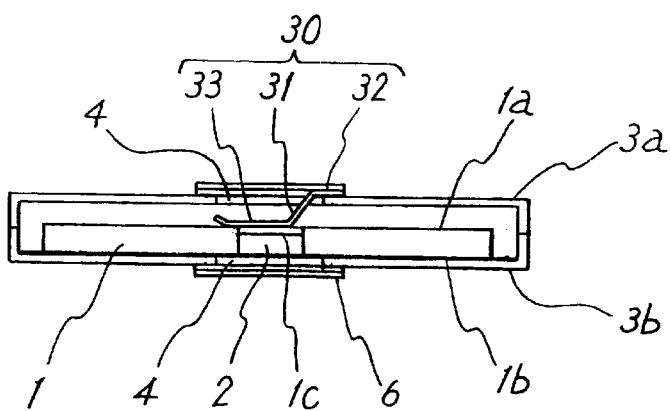
FIG. 1C shows a cross-sectional view in which the cartridge is viewed in a direction of Y—Y.

FIGS. 1A to 1C show an illustrative cartridge for magneto-optical disks according to the present invention, especially according to a first embodiment of the present invention. FIG. 1A shows a plan view illustrating the cartridge 100, FIG. 1B shows a longitudinal sectional view in which the cartridge 100 is viewed in a direction of X—X, and FIG. 1C shows a cross-sectional view in which the cartridge 100 is viewed in a direction of Y—Y. The magneto-optical disk cartridge 100 has a magneto-optical disk 1 and a cartridge case 3 for accommodating the magneto-optical disk 1 therein. The magneto-optical disk 1 has a diameter of 130 mm and a thickness of about 0.6 mm, and it has a hub 1C at the center of an upper surface 1a. The magneto-optical disk 1 is formed with a center 2 for inserting a spindle (reference numeral 200 in FIG. 2C) of a driving unit thereinto.

The cartridge case 3 comprises two parts of an upper case 3a which appears on the front side concerning the plane of the paper in FIG. 1A, and a lower case 3b which exits on the back side concerning the plane of the paper in FIG. 1A. The upper case 3a and the lower case 3b are configured to be substantially symmetric in the direction of the thickness of the cartridge case 3 (direction perpendicular to the plane of the paper in FIG. 1A). Spindle holes 4a, 4b are formed at central portions of the upper case 3a and the lower case 3b respectively. As shown in FIG. 1A, rectangular windows 5a, 5b are formed on the upper case 3a and the lower case 3b respectively. Each of the windows 5a and 5b is disposed above the respective spindle hole 4a, 4b and which is continued to the respective spindle hole 4a, 4b.

The cartridge 100 further comprises a shutter 6 which is capable of simultaneously opening or closing the windows 5a, 5b. As shown in FIG. 1B, the shutter 6 has shutter planes 6a, 6b for covering the windows 5a, 5b respectively. The shutter planes 6a, 6b are connected by a connecting surface 6C which extends in the direction of the thickness of the cartridge 100. Protrusions 6d, 6d', which protrude toward the cartridge case, are formed at end portions of the shutter planes 6a, 6b on sides opposite to the connecting surface 6C respectively. The protrusions 6d, 6d' are engaged with guide grooves 60 which are formed on the surfaces of the upper case 3a and the lower case 3b to extend in the horizontal direction in FIG. 1A respectively. The protrusions 6d, 6d' are slidable on and along the guide grooves 60. Thus, the windows 5a, 5b can be opened and closed by the shutter 6. FIG. 2A shows a situation in which the shutter 6 is open. The shutter 6 is automatically opened when the cartridge 100 is installed to an unillustrated drive in order to perform reproduction or recording for the information recorded on the disk 1 as described in detail later on.

As shown in FIGS. 1B and 1C, a plate spring 30 is provided between the back surface of the shutter plane 6a and the upper surface 1a of the disk 1 accommodated in the case 3. As shown in FIG. 1C, the plate spring 30 comprises a support section 32 for being supported by the back surface of the shutter plane 6a, an arm section 31 which extends from the support section 32 toward the inside of the cartridge case, and a pressing section 33 for pressing the disk 1, especially for pressing the hub 1c of the disk 1. The support section 32 is glued or secured to the back surface of the shutter plane 6a. The plate spring 30 is compressed between the back surface of the shutter plane 6a and the upper surface 1a of the disk 1. Therefore, the restoring force is exerted by the aid of the arm section 31 so that the pressing section 33 tends to be separated from the support section 32. The disk 1 is urged by the pressing section 33 by the aid of the restoring force of the plate spring 30, and it is pressed against the lower case 3b. Accordingly, the accommodated disk 1 is immovable in the cartridge case 3 when the shutter 6 of the cartridge 100 is closed. In this state, the lower surface 1b of the disk 1 is supported on the inner wall surface of the cartridge.

The inner wall surface of the cartridge is flat in view of the fact that the lower surface 1b of the disk 1 is pressed against the inner wall surface of the cartridge. It is desirable that the surface of the disk 1 to be pressed against the inner wall surface of the cartridge is a surface which does not badly affect recording or reproduction of information. For example, when the disk 1 is a magneto-optical disk, the surface 1c of the disk 1 to be pressed against the inner wall surface of the cartridge is desirably a surface (usually a surface coated with a protective film) disposed on a side opposite to the substrate of the disk 1, because of the following reason. That is, the magneto-optical disk usually has a structure comprising a magnetic film and a protective film stacked on a transparent substrate, in which the recording or reproducing light beam comes into the disk on a side of the substrate.

When the cartridge 100 is installed to the driving unit (not shown) for performing recording and reproduction on the magneto-optical disk 1, a shutter-opening mechanism (not shown) of the driving unit is operated so that the shutter 6 of the cartridge 100 is opened as shown in FIG. 2A until the windows 5b, 5b completely appear. The shutter 6 is opened as the protrusions 6d, 6d' provided on the back surfaces of the shutter planes 6a, 6b slide on the guide grooves 60 formed on the surfaces of the upper case 3a and the lower case 3b as described above. During this process, as shown in FIGS. 2B and 2C, the arm section 31 and the pressing section 33 of the plate spring 30 are folded and retracted into the space between the shutter plane 6a and the upper case 3a to give a flat plate configuration.

As shown in FIGS. 2B and 2C, when the cartridge 100 is installed to the driving unit, then the spindle 200 of a driving motor (not shown) of the driving unit is inserted into the center hole 2 of the disk 1 through the spindle hole 4b of the lower case 3b of the cartridge 100, and it is fastened by the hub 1c. In this state, the disk 1 is not supported by the inner wall of the cartridge case 3, and it is rotatable while being supported by only the spindle 200 in the cartridge case 3.

Figure 25A:
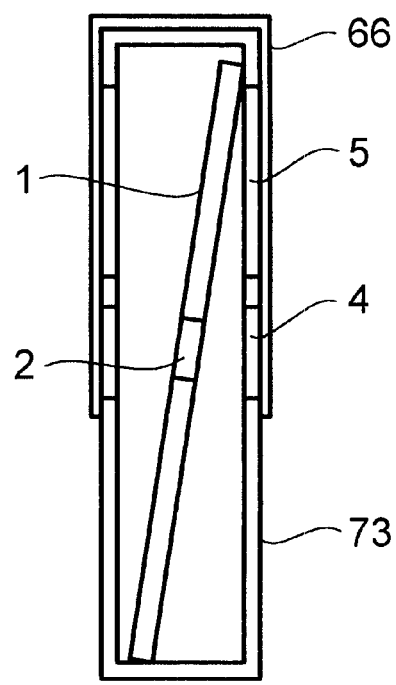
FIG. 25A shows a state in which a conventional cartridge is allowed to stand perpendicularly.
Figure 26A:
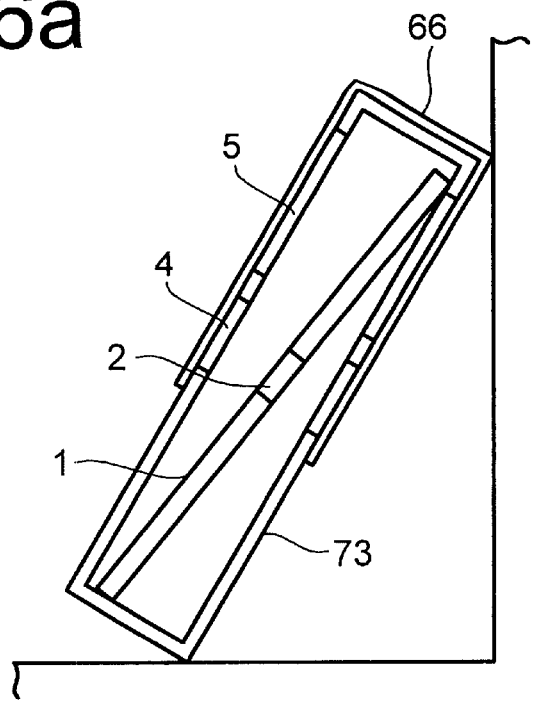
FIG. 26A schematically shows a situation in which the conventional cartridge is allowed to lean obliquely against the wall, and FIG. 26B schematically shows a situation in which the warpage deformation occurs in the disk accommodated in the cartridge case when the cartridge is thereafter left to lean against the wall.
Figure 26B:
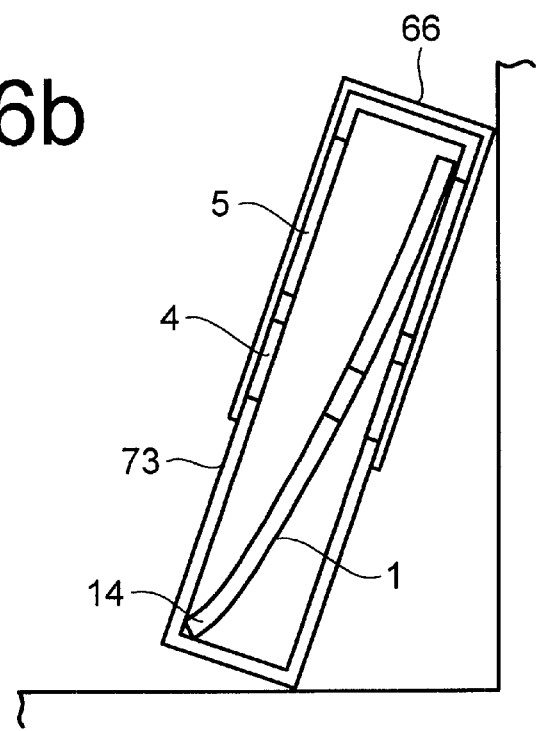

The use of the cartridge illustrated in this embodiment allows the disk to be tightly held against the inner wall surface of the cartridge in a state in which the disk is immovable in the cartridge case, even when the cartridge takes an arbitrary posture after being taken out of the driving unit, especially even when the cartridge is arranged in an inclined state in which any warpage would hitherto occur in the disk (see FIGS. 25A and 26A). Therefore, the disk is effectively prevented from occurrence of warpage and deformation.

The material for the plate spring 30 is not specifically limited, for which it is possible to use, for example, various metals having elasticity, ceramics, and plastics. Those usable as the metal material include, for example, Cr—Fe alloy, Ni—Cr—Fe alloy, Cu alloy, spring steel (C: 0.5 to 1.1%, Si: 0.3 to 1.5%, Mn: 0.3 to 1.7%, balance: Fe), stainless alloy (SUS304, SUS302), and piano wire material. Those usable as the plastic include hard vinyl chloride resin, polypropylene, polyethylene, ABS, polycarbonate, acryl, methacryl, and silicon resins. It is also possible to use a plate spring composed of a composite material in which the surface of the metal plate spring is coated with plastic or ceramic.

The shutter 6 can be joined to the support section 31 of the plate spring 30 by using an arbitrary joining method. For example, the plate spring may be used as it is, or the plate spring is embedded as a core in a plastic resin plate to make joining or coupling by means of injection molding, insert mold, ultrasonic fusion, fixation with rivet, or adhesion with adhesive.

Figure 3:
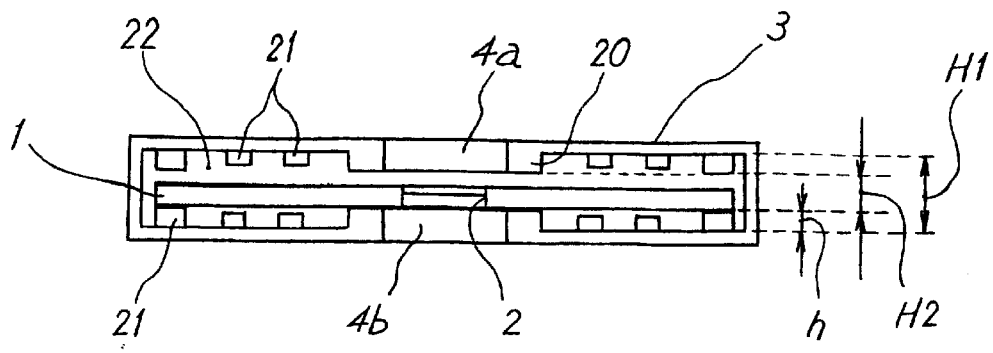
FIG. 3 shows a modified embodiment of the cartridge shown in FIGS. 1A to 1C, illustrating a sectional view of a cartridge having studs provided on inner walls of a cartridge case.
Figure 27A:
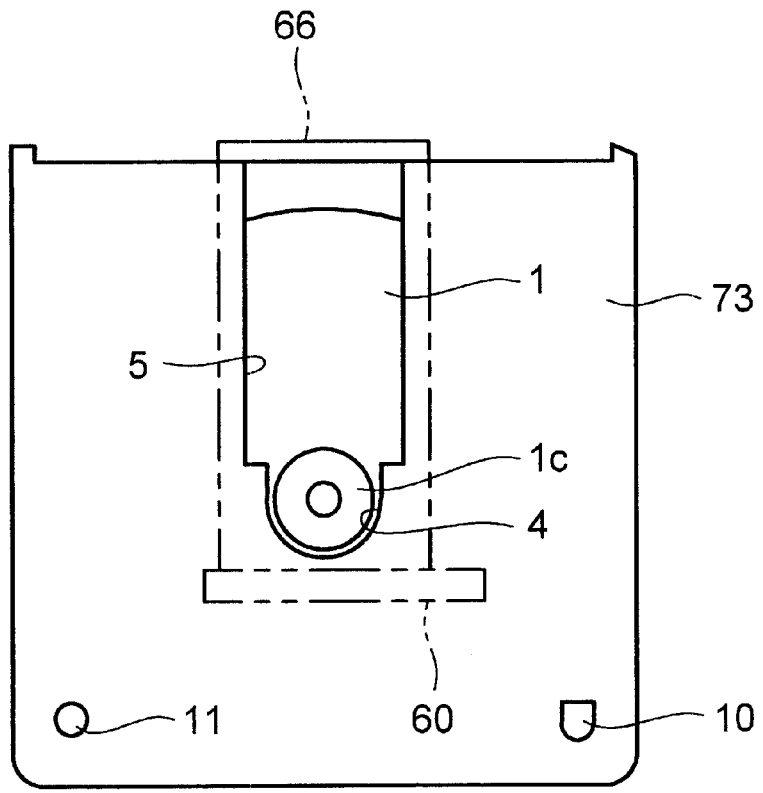
FIG. 27A shows a plan view illustrating a cartridge provided with studs, and FIG. 27B schematically shows a situation in which the warpage deformation occurs in the outer circumferential portion of a disk when the disk is left while being placed on the stud of the cartridge.
Figure 27B:
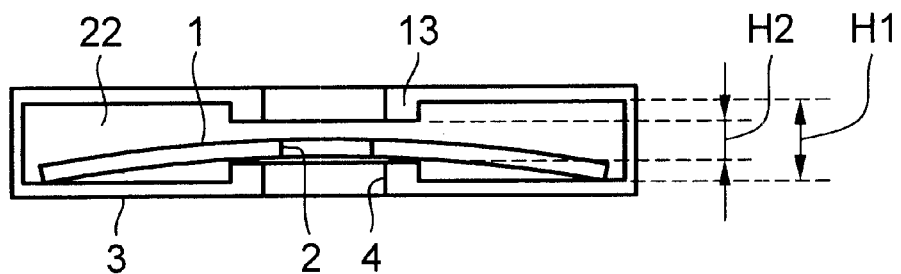
Figure 28:
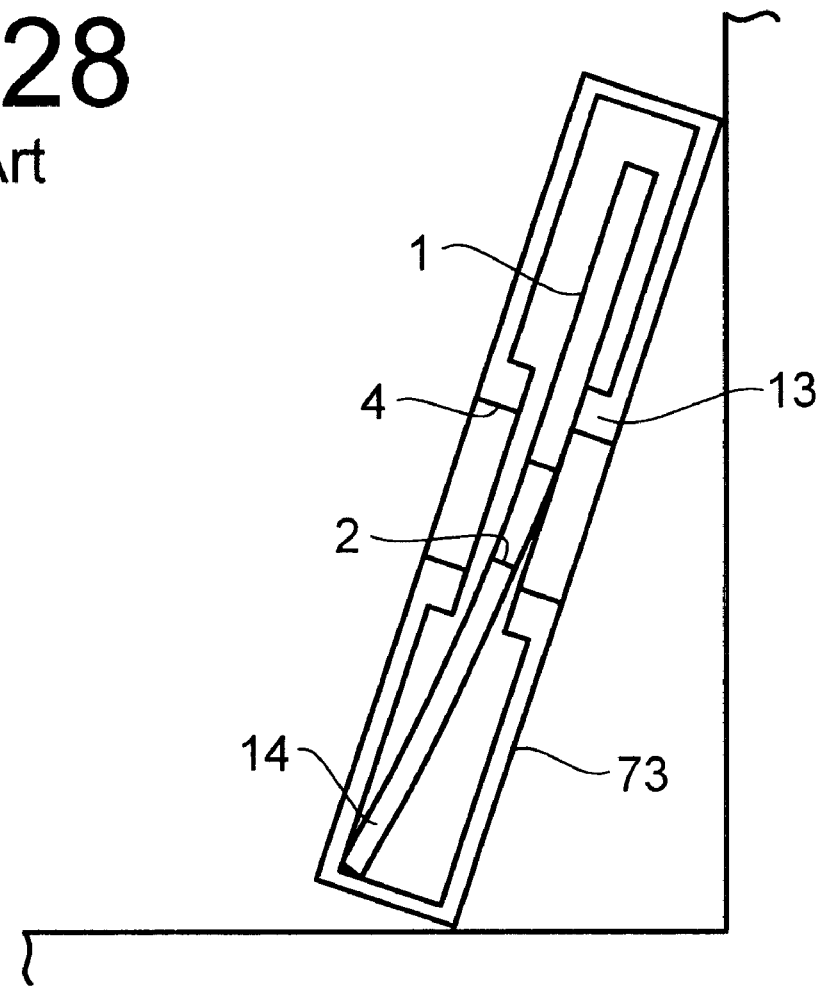
FIG. 28 schematically shows a situation in which the warpage deformation occurs in a disk accommodated in the cartridge case due to its own weight when the cartridge shown in FIG. 27A is left in a state of being allowed to lean obliquely against the wall.

A modified embodiment of the cartridge shown in FIGS. 1A to 1C and FIGS. 2A to 2C is illustrated in a sectional view shown in FIG. 3, in which studs 20 are provided on the inner walls of the cartridge case 3. The studs 20 are provided on the upper case 3a and the lower case 3b respectively. Each of the studs 20 may be an annular projection capable of supporting a non-recording area in the vicinity of the disk center hole 2. The studs 20 define spindle holes 4a, 4b as well. In the embodiment shown in FIG. 3, the space thickness H1 in the cartridge case 3 is 3.84 mm. The spacing distance H2 between the studs 20 of the upper case 3a and the lower case 3b is 2.84 mm. The height dimension h is 0.5 mm for both of the studs 20. As described above, the thickness of the accommodated magneto-optical disk 1 is 0.6 mm. Annular ribs 21 may be further provided on the inner walls of the upper case 3a and the lower case 3b. The rib 21, which is disposed at the outermost circumferential portion, preferably has approximately the same height as that of the stud 20. By doing so, even when the disk 1 is pressed against the inner wall of the cartridge case 3 by the aid of the plate spring 30, then the disk is supported by the stud 20 on the inner circumferential side, and the disk is supported by the outermost circumferential rib 21 on the outer circumferential side. Accordingly, even when the cartridge 100 is arranged horizontally, the load due to the own weight is not exerted on the outer circumferential portion of the disk 1. Thus, the warpage and the deformation of the outer circumferential portion is avoided, which would be otherwise caused as shown in FIG. 27B.

When only one side of the disk is effective for recording and reproduction, any one of the windows 5a, 5b may be omitted. One of the spindle holes 4a, 4b (spindle hole 4a in the case of FIGS. 2A–2C) may be also omitted Alternatively, in the case of a drive unit of the type in which the disk is interposed on upper and lower sides in the drive unit, it is unnecessary to provide the hub 1C for the disk 1. The thickness of the area of the disk, which is pressed by the pressing section, may be increased. By doing so, an effect is obtained in that local deformation is avoided, which would be otherwise caused by the pressing force. The illustrative modifications described above are applicable to cartridges concerning embodiments other than the cartridge concerning this embodiment.

Second Embodiment

Figure 4A:
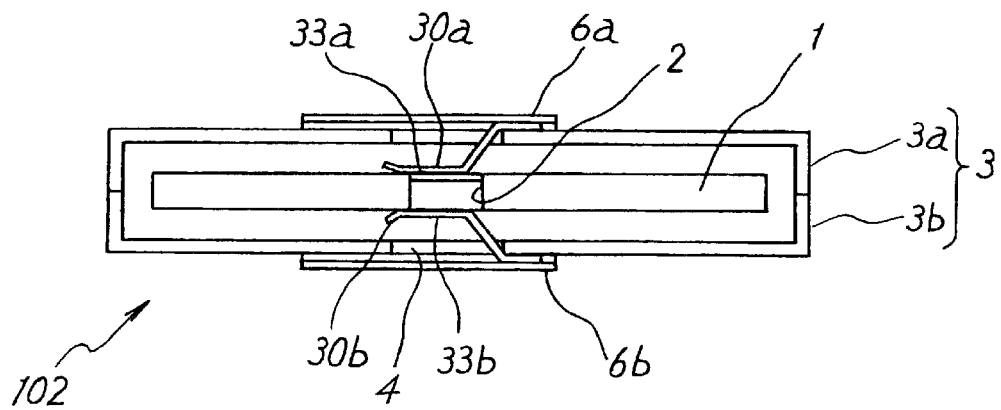
FIG. 4A shows a longitudinal sectional view in which a cartridge comprising plate springs provided on a side of an upper case and on a side of a lower case is viewed in a direction of X—X in a plan view corresponding to FIG. 1A.
Figure 4B:
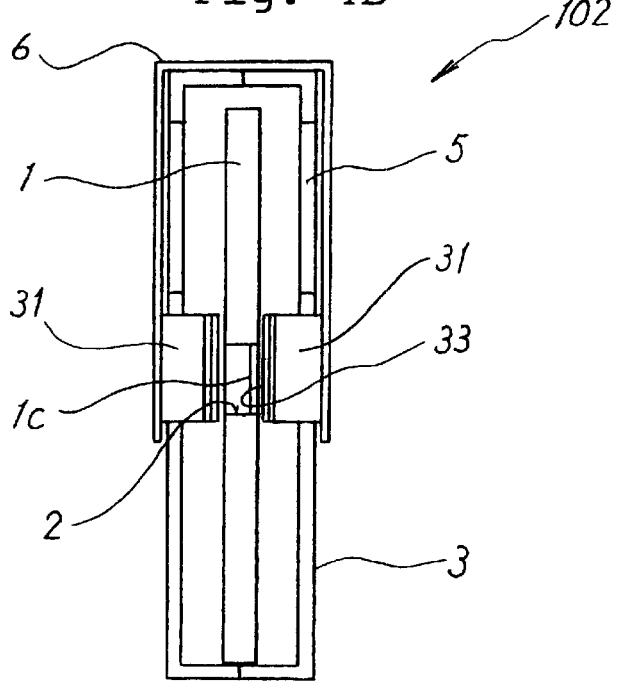
FIG. 4B shows a cross-sectional view in which the cartridge is viewed in a direction of Y—Y in the plan view corresponding to FIG. 1A.

In this embodiment, the plate springs 30 as used in the first embodiment are used on both sides of the upper surface 1a and the lower surface 1b of the magneto-optical disk 1 (on the side of the upper case 3a and on the side of the lower case 3b) to support the disk 1 in a cartridge. Plan views in this embodiment, which depict the shutter-open state and the shutter-closed state of the magneto-optical disk cartridge, are similar to FIG. 1A and FIG. 2A respectively. Accordingly, FIG. 1A and FIG. 2A are used to explain this embodiment. Sectional views of the cartridge, in which the cartridge is viewed in the X—X direction and in the Y—Y direction shown in FIG. 1A, are shown in FIG. 4A and FIG. 4B respectively. Plate springs 30a, 30b are provided on back sides of the shutter planes 6a, b respectively, and they extend to the inside of the upper case 3a and the lower case 3b respectively. Pressing sections 33a, 33b of the plate springs 30a, 30b press the hub 1c of the disk 1 and the outer circumferential portion of the center hole 2 opposed to the hub 1c respectively. Accordingly, the disk 1 is held at a central position in the thickness direction in the cartridge 102. Each of the plate springs 30a, 30b is equivalent to the plate spring 30 used in the first embodiment.

Figure 5:
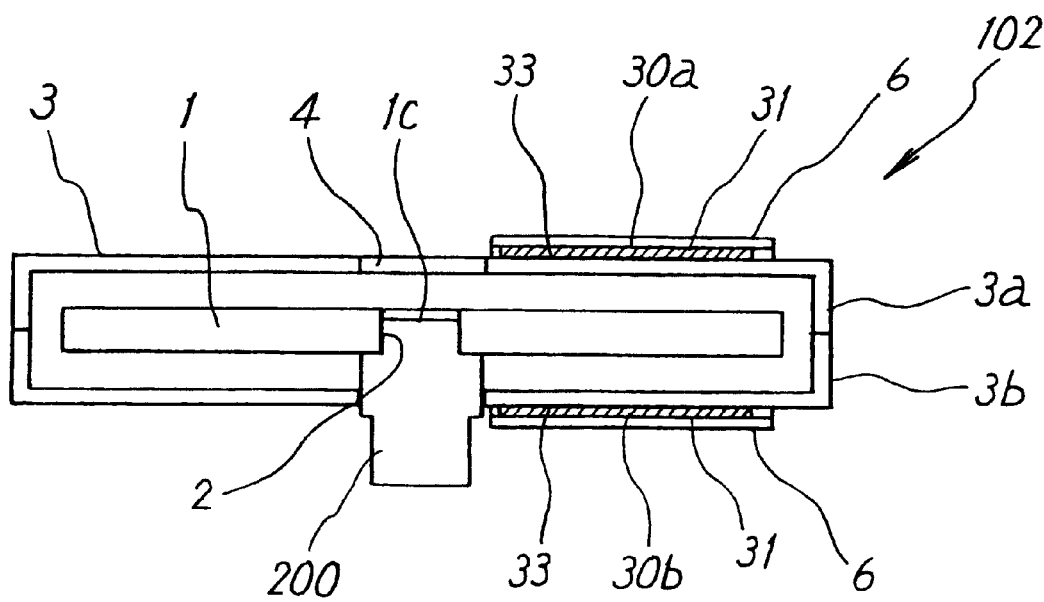
FIG. 5 shows a longitudinal sectional view in which a situation of the cartridge shown in FIG. 4 installed to a driving unit with its open shutter is viewed in a direction of X—X in the plan view corresponding to FIG. 1A.
Figure 6:
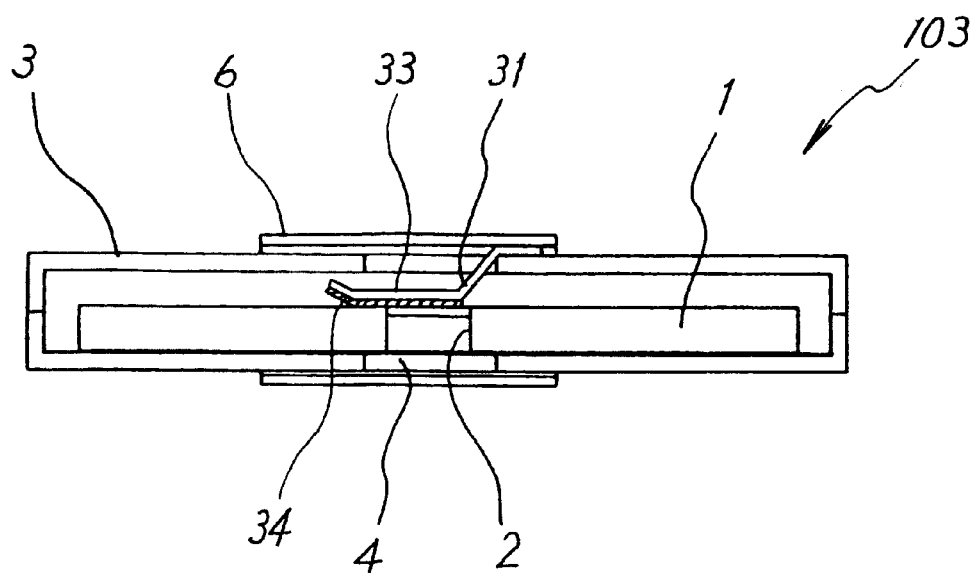
FIG. 6 shows a sectional view illustrating a cartridge in which a protective material is provided on a surface on a side opposing to a disk, of a pressing section of a plate spring of the cartridge shown in FIG. 1.

FIG. 5 shows a situation in which the cartridge 102 shown in FIG. 4A is installed to a driving unit, and the shutter 6 is opened. As shown in FIG. 5, the arm sections 31a, 31b and the pressing sections 33a, 33b of the plate springs 30a, 30b are folded and retracted into the spaces between the shutter plane 6a and the upper case 3a and between the shutter plane 6b and the lower case 3b to give flat plate configurations respectively.

The use of the cartridge 102 illustrated in this embodiment also makes it possible to prevent the magneto-optical disk from warpage and deformation when the cartridge is stored and preserved in a state in which the cartridge is allowed to stand perpendicularly or the cartridge is allowed to lean obliquely. Studs and ribs may be provided on the inner walls of the cartridge case as shown in FIG. 3 which depicts the modified embodiment of the first embodiment.

Third Embodiment

A cartridge 103 is produced in the same manner as in the first embodiment except that a protective material 34 is provided on the surface of the pressing section 33 of the plate spring 30 on the side of the disk 1. The provision of the protective material on the pressing section 33 for making contact with the surface of the disk 1 prevents the surface of the disk 1 from damage. The protective material 34 may be provided on at least a part of the pressing section 33, preferably on the entire surface of the pressing section 33, and more preferably on the arm section 31 in addition to the pressing section 33. Those usable as the protecting material include, for example, cushioning materials such as liner materials used for flexible (floppy) disks, plastic fiber nonwoven fabrics, polypropylene fiber nonwoven fabrics, polystyrene fiber nonwoven fabrics, polyurethane foams, silicone rubber, and neoprene rubber, and lubricating materials such as nylon, polyacetal, and fluororesin. The protective material 34 may be fixed to the plate spring 30 by means of, for example, application, sticking with adhesive, insert mold, and rivet. Alternatively, the protective material 34 may be fixed to the plate spring 30 by means of ultrasonic welding.

Fourth Embodiment

Figure 7A:
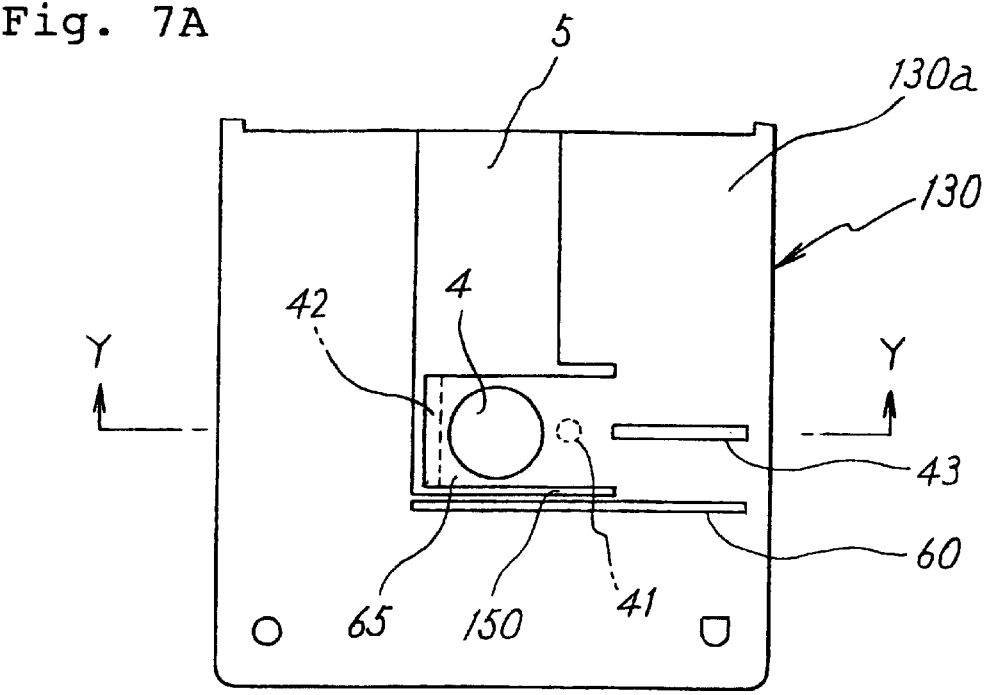
FIG. 7A shows a plan view illustrating a cartridge case formed with a cutout and a pressing section.
Figure 7B:
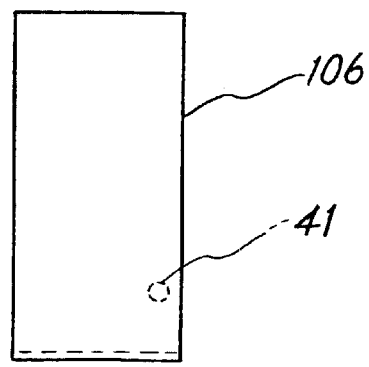
FIG. 7B shows a plan view illustrating a shutter to be installed to the cartridge case described above.
Figure 8A:
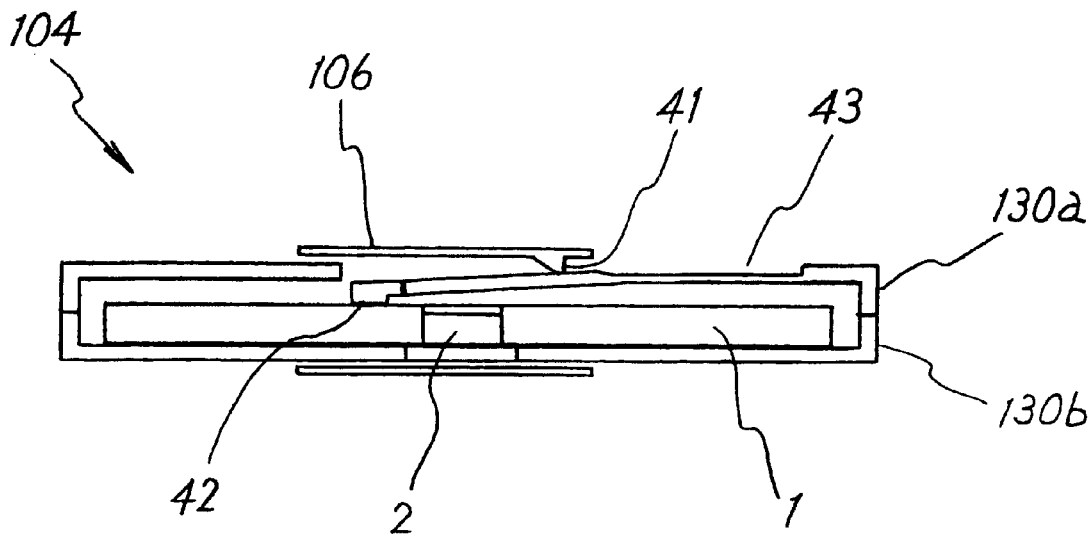
FIG. 8A shows a cross-sectional view in which a state of the cartridge shown in FIG. 7 with its open shutter is viewed in a direction of Y—Y.
Figure 8B:
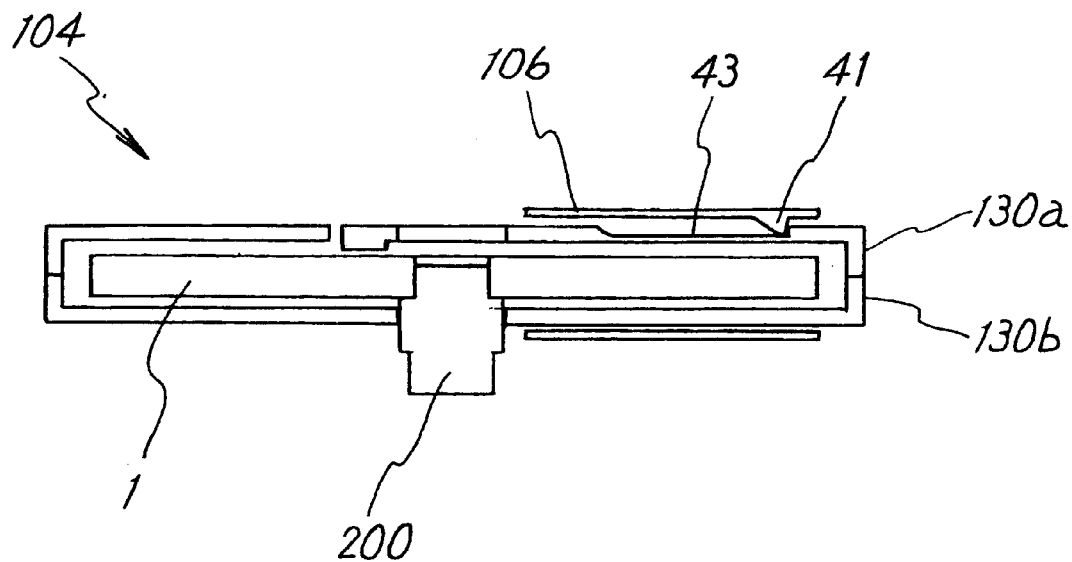
FIG. 8B shows a cross-sectional view in which a state of the cartridge shown in FIG. 7 with its closed shutter is viewed in the direction of Y—Y.

FIGS. 7A and 7B show a cartridge case 130 and a shutter 106 to be used for a cartridge 104 according to this embodiment respectively. FIGS. 8A and 8B show sectional views of the cartridge 104 in which the shutter 106 is installed to the cartridge case 130 which accommodates the disk 1. Any one of FIGS. 8A and 8B is a sectional view as viewed in the direction Y—Y shown in FIG. 7A. FIGS. 8A and 8B show states in which the shutter 106 is closed and open respectively. As shown in FIG. 7A, the cartridge case 130 is provided with a cutout 150 so that the spindle hole 4 is surrounded thereby. Thus, a rectangular central area 65, which includes the spindle hole 4, is comparted. As understood from FIGS. 8A and 8B, a pressing section 42, which protrudes toward the disk 1, is formed on the inner wall of the cartridge at the tip of the comparted central area 65 (left side in FIG. 7A). The pressing section 42 corresponds to the pressing section 33 of the plate spring 30 described in the first embodiment.

Figure 7C:
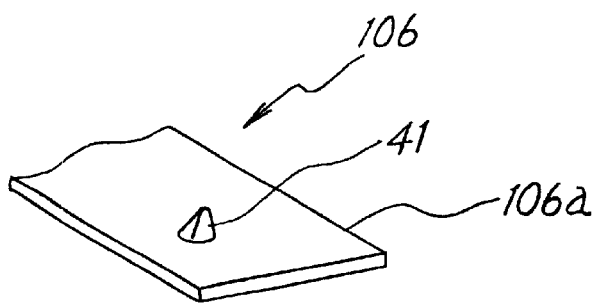
FIG. 7C shows a magnified perspective view illustrating a back surface of an upper side surface of the shutter shown in FIG. 7B.

As shown in FIG. 7B, the shutter 106 is provided with a projection 41 at a position corresponding to a part of the central area 65 of the cartridge case 130 in a state in which the shutter 106 is closed. FIG. 7A shows a position of the projection 41 by using a phantom line in a state in which the shutter 106 is closed. In order to understand the structure of the projection 41 more easily, FIG. 7C shows a magnified perspective view illustrating the back side of the upper side surface 106a of the shutter 106. As shown in FIG. 8A, the projection 41 presses a part of the central area 65 of the cartridge case 130 when the shutter 106 is closed. Accordingly, the central area 65 is warped toward the disk 1 by using a support point of the connecting portion with respect to the cartridge case 130. The pressing section 42, which is provided at the tip of the central area, presses a part of the inner circumferential portion of the disk 1. As a result, the disk 1 is pressed against the inner wall of the lower case 130b of the cartridge case 130, and it is fixed in the cartridge 130. Therefore, no load is exerted on the outer circumferential portion of the disk accommodated in the cartridge even when the disk cartridge 130 is left for a long period of time in a state of being allowed to lean obliquely. Thus, it is possible to avoid warpage and deformation.

When the cartridge 104 is installed to the driving unit for the disk 1, and the shutter 106 for the recording medium is opened, then the projection 41, which is formed on the back surface of the shutter 106, falls into a groove 43 formed on the upper case 130a of the cartridge case 130, and it is moved in the inside along the groove 43. Accordingly, as shown in FIG. 8B, the projection 41 no longer presses the central area 65. Therefore, the pressing section 42 disposed at the tip does not make contact with the disk 1.

In this embodiment, the shape of the pressing section 42 may be an arbitrary shape including, for example, straight, circular, and annular configurations as well as configurations composed of a plurality of points. The dimension of the central area 65 can be also arbitrarily changed. The central area 65 has been comparted to surround the spindle hole 4. However, it is allowable that the vicinity of the window 5 is subjected to cutout to provide the pressing section 42 in the vicinity of the window 5. Preferably, the pressing section 42 presses the hub 1C on the disk 1. Accordingly, the spindle hole 4a may be closed, and the pressing section 42 may be provided at its center.

The cartridge 130 shown in FIGS. 7A to 7C and FIGS. 8A and 8B has the central area 65 and the pressing section 42 which are provided on the side of the upper case 130a of the cartridge case 130. However, the central area 65 and the pressing section 42 may be provided on the side of the lower case 130b, and the projections 41 may be provided on both shutter planes of the shutter 106. In the cartridge structured as described above, the disk 1 is fixed by the pressing sections disposed on its both sides in the cartridge case when the shutter is closed. Also in this case, the two pressing sections press the both surfaces of the disk 1. Therefore, it is desirable that the pressing section is provided at the portion corresponding to the hub 1C of the disk 1 and at the portion corresponding to the non-recording area disposed on the inner circumferential side, in order that the pressing section does not press the recording section of the disk 1 and the substrate portion corresponding to thereto.

In order not to contact and scratch the disk 1, it is desirable that the pressing section 42 is provided with, for example, cushioning materials such as liner materials, plastic fiber nonwoven fabrics, polypropylene fiber nonwoven fabrics, polystyrene fiber nonwoven fabrics, polyurethane foams, silicon rubber, and neoprene rubber, and lubricating materials such as nylon, polyacetal, and fluororesin.

The thickness of the central area is not specifically limited. However, the central area is generally used with a thickness in a range of 0.5 to 2.5 mm. Especially, the central area preferably has a thickness which is same as or not more than the thickness of the plate of the disk cartridge case 3. As for the length of the central area 65 (length in the horizontal direction shown in FIG. 7A), it is necessary that the thicker the thickness of the cartridge case is, the longer the length is, in order to give the elasticity. For example, in the case of a disk recording medium of 5.25 inches (about 130 mm), the length of the central area 65 is appropriately 2.5 to 10 mm. In general, the central area 65 is used with a thickness in a range of 1.0 to 30 mm.

Those usable as the material for the projection 41 provided on the shutter 106 may be arbitrary materials. The method for forming the projection is also not specifically limited. For example, when the shutter 106 is made of metal such as stainless steel, the projection 41 may be formed by deforming the metal at a predetermined position. When the shutter 106 is composed of a plastic material, then the shutter 106 may be deformed at a predetermined position, the shutter 106 may be integrally formed by means of injection molding or insert mold, or the projection 41 may be glued with adhesive. The projection 41 may be fixed by means of electric fusion (high frequency fusion), ultrasonic fusion, or rivet.

At least the surface of the projection 41 and the surface of the groove 43 formed on the cartridge case 130 for allowing the projection 41 to slide thereon are formed of a lubricating material having high lubricating performance such as graphite carbon and fluorocarbon compound. Alternatively, they are coated with a film made of an abrasion-resistant material having high hardness such as diamond crystalline carbon, silicon carbide, titanium carbide, aluminum carbide, silicon nitride, and silicon oxide.

In this embodiment, the central area 65 is formed by forming the cutout 150 in the cartridge case 130. Therefore, the central area 65 is integrated with the cartridge case 130. However, the central area 65 may be excised, and another elastic member (elastic tongue) having a shape similar to the central area may be attached in place thereof. Those usable as the elastic member include, for example, a ceramic thin plate, a metal plate spring, and a ceramic plate spring. Those usable as the material for the metal plate spring include Cr—Fe alloy, Ni—Cr—Fe alloy, Cu alloy, spring steel (C: 0.5 to 1.1%, Si: 0.3 to 1.5%, Mn: 0.3 to 1.7%, balance: Fe), stainless alloy (SUS304, SUS302), and piano wire material. The elastic member may be coated with a plastic resin. In view of the elasticity and the durability, those preferably usable as the plastic resin include plastics such as hard vinyl chloride resin, polyurethane resin, polypropylene resin, hard polyethylene resin, polyimide resin, polyamide resin, polyester resin, polycarbonate resin, and ABS resin. The resin may be mixed with a filler such as carbon fiber and asbestos fiber. The method for connecting the plate spring used in the first embodiment may be used to connect the cartridge case 130 and the elastic member.

Fifth Embodiment

Explanation will be made in this embodiment with reference to FIGS. 9A and 9B and FIGS. 10A to 10C for a cartridge comprising a pressing member which has a function similar to those of the plate spring described in the first embodiment and the central area described in the fourth embodiment, the pressing member being accommodated in a cartridge case.

Figure 9A:
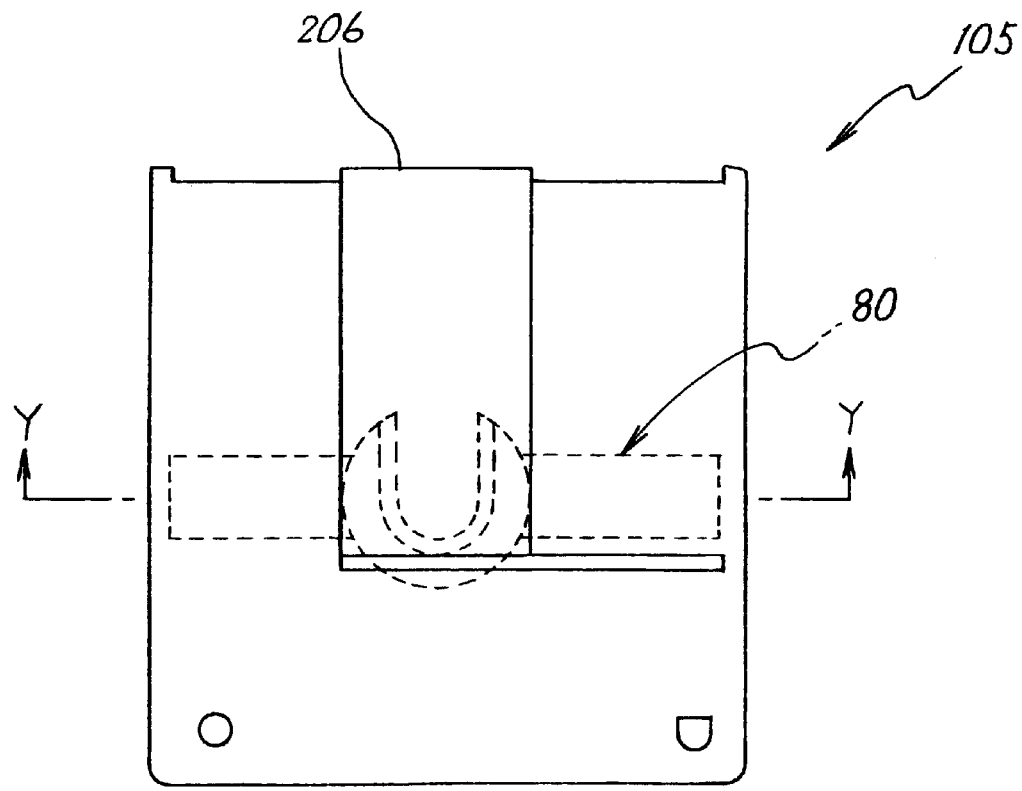
FIG. 9A shows a plan view illustrating a state in which a pressing member having a function similar to that of a plate spring in the first embodiment or a central area in the fourth embodiment is accommodated in a cartridge case to provide a cartridge with its closed shutter.
Figure 9B:
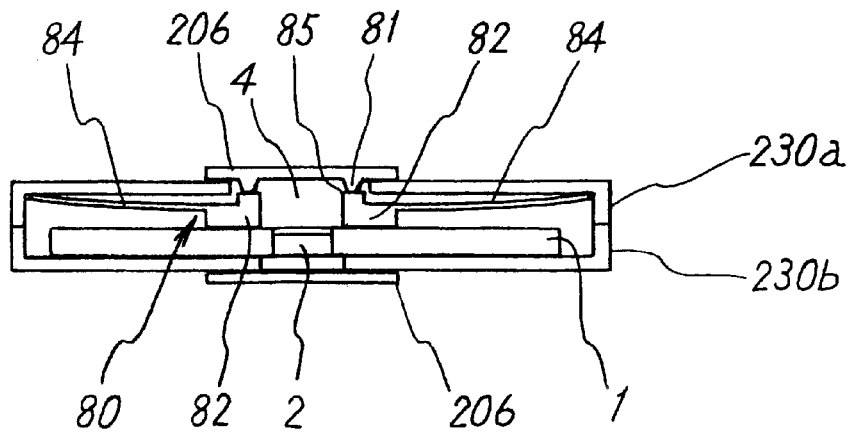
FIG. 9B shows a cross-sectional view in which the cartridge is viewed in a direction of Y—Y.
Figure 10A:
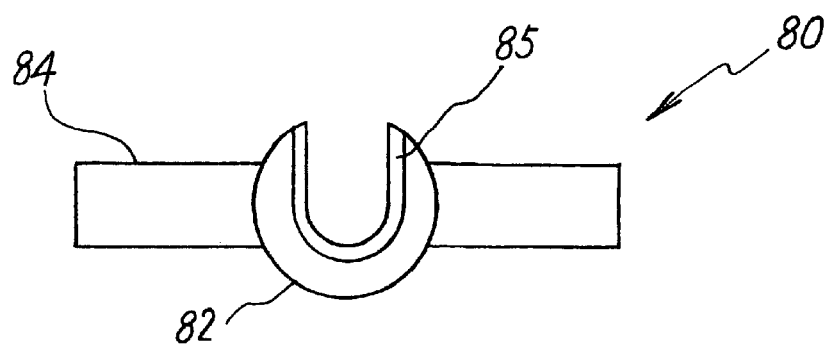
FIG. 10A shows a plan view illustrating the pressing member taken out of the cartridge shown in FIG. 9A.

FIGS. 9A and 9B show a plan view of the cartridge 105 according to this embodiment and a sectional view in which the cartridge 105 is viewed in a direction of Y—Y respectively. The cartridge 105 comprises a pressing member 80 provided therein. FIG. 10A shows a plan view illustrating the pressing member 80 taken out of the cartridge 105. The pressing member 80 has an annular pressing section 82 made of polycarbonate, and a pair of arm sections 84 attached symmetrically to the outer circumference of the pressing section. The annular pressing section extends upwardly at its inner circumferential side to form a U-shaped protrusion 85. The U-shaped protrusion 85 is formed to be fitted to a spindle hole 4 formed through an upper case 230a of a cartridge case 230 (see FIG. 10C).

The pressing section 82 may have a thickness of 1.0 to 2.5 mm at the U-shaped protrusion 85. The arm sections 84 are made of stainless steel. Ends of the arm sections 84 are fixed to the inner wall of the upper case 230a of the cartridge case 230 as shown in FIG. 9B.

Figure 10B:
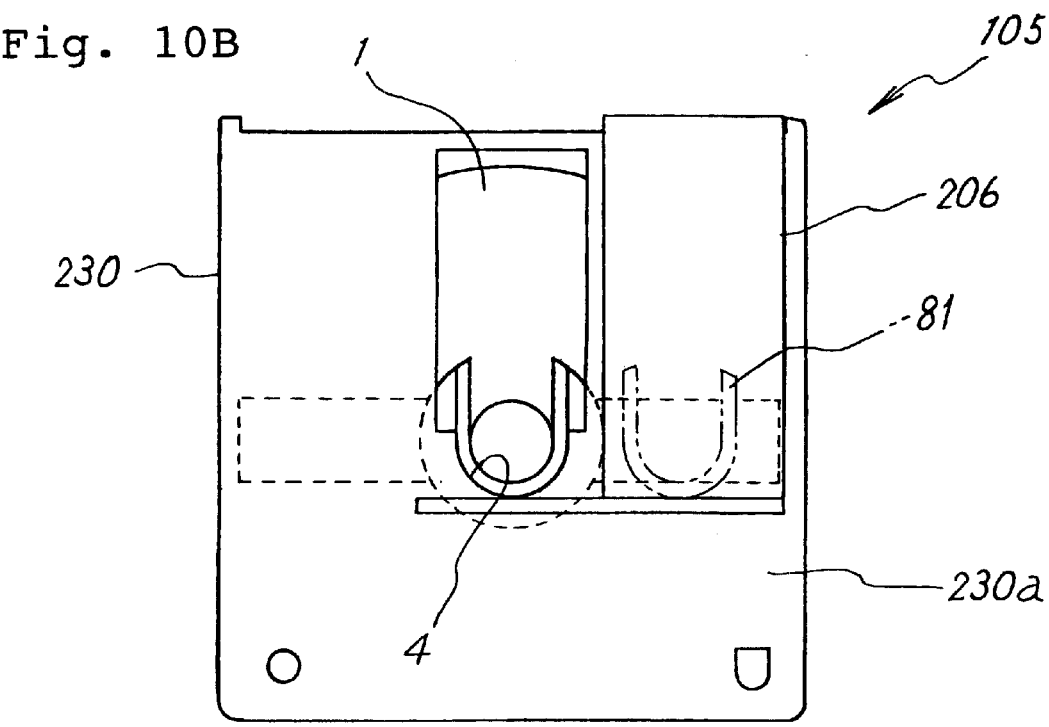
FIG. 10B shows a plan view illustrating a state in which the shutter of the cartridge shown in FIG. 9A is open.

FIG. 10B shows a plan view illustrating a state in which a shutter 206 of the cartridge 105 is open. The shutter 206 has a U-shaped projection 81 which protrudes on the back surface of the upper shutter plane, and which corresponds to the U-shaped protrusion 85 formed at the pressing section 82.

Figure 11:
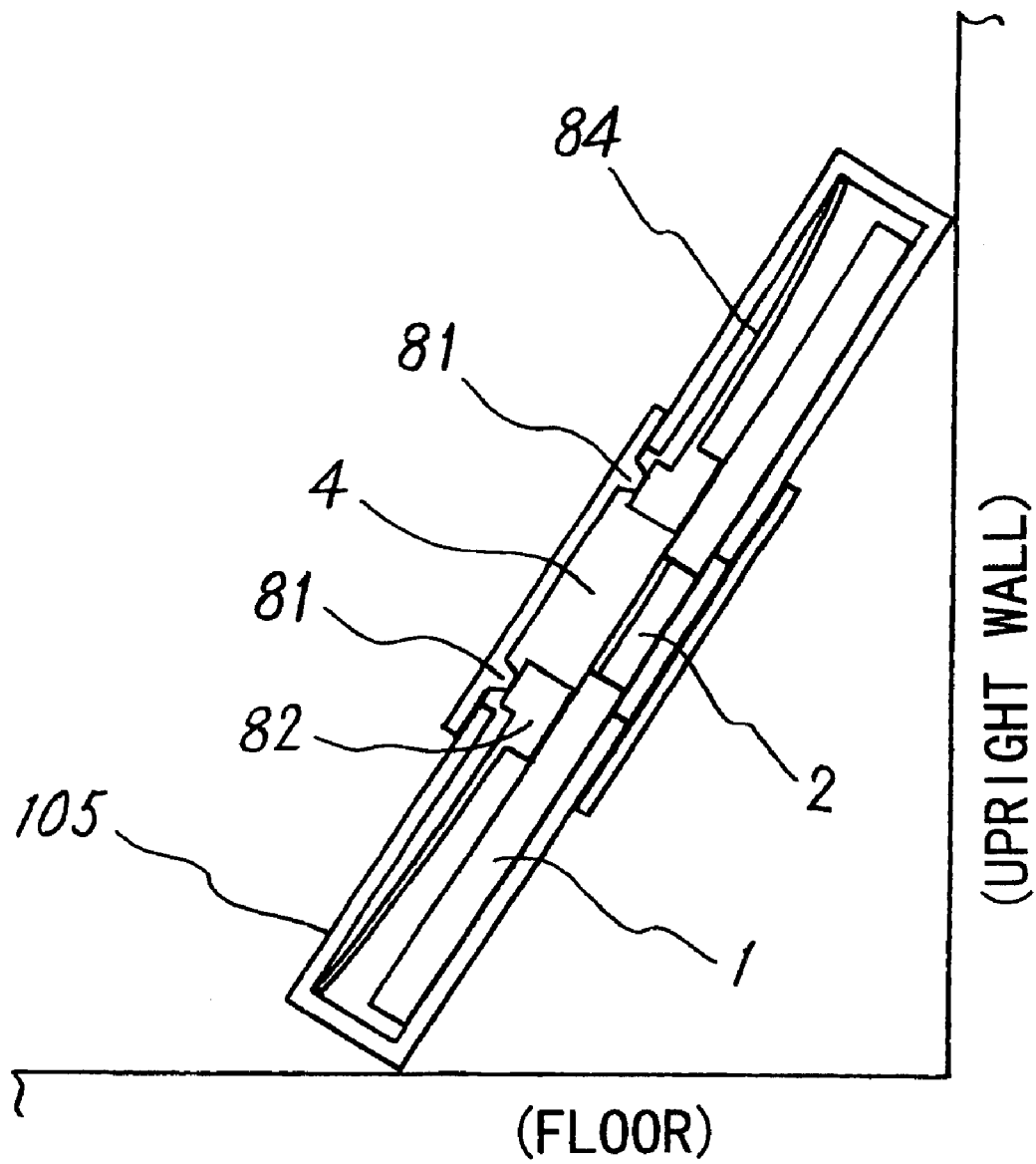
FIG. 11 schematically shows a situation in which the cartridge shown in FIGS. 9A and 9B is allowed to lean against a wall.

With reference to FIGS. 9A and 9B again, when the shutter 206 is closed, then the U-shaped projection 81 formed on the back surface of the shutter is positioned on the U-shaped protrusion 85 of the pressing section 82, and it urges the U-shaped protrusion 85 downwardly. The pressing section 82 is elastically supported with respect to the cartridge case 230 by the aid of the pair of arm sections 84. Therefore, the pressing section 82 is pressed against the disk 1 by means of the urging force exerted by the arm sections 84. Further, the disk 1 is pressed against the inner wall of the lower case 230b by means of the urging force, and it is fixed in the cartridge 105. Even when the cartridge 105 takes any posture, for example, even when the cartridge 105 is allowed to lean obliquely against the wall as shown in FIG. 11, then the disk 1 is pressed against the flat inner wall of the lower case 230b by means of the urging force applied by the arm members 84. Therefore, no deflected force is exerted on the disk 1 from the inner wall of the cartridge case. Accordingly, the disk 1 is prevented from warpage and deformation.

Figure 10C:
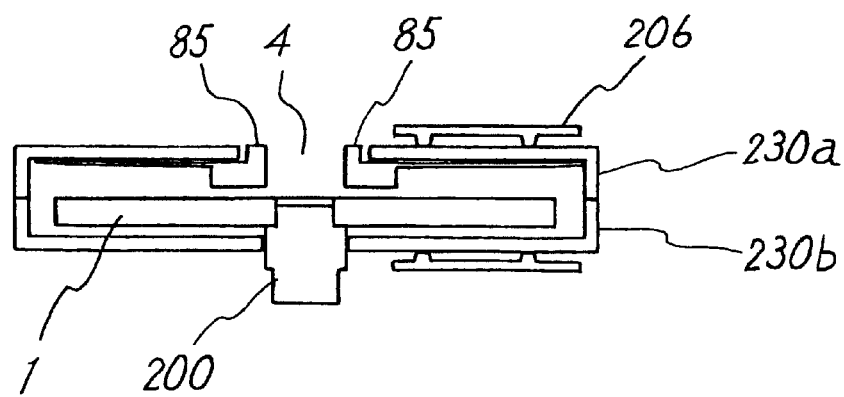
FIG. 10C shows a cross-sectional view in which the state of the open shutter is viewed in the direction of Y—Y shown in FIG. 9A.

When the cartridge 105 is installed to a driving unit, and the shutter 206 of the cartridge 105 is opened thereby, then as shown in FIG. 10B, the U-shaped projection 81 disposed on the back surface of the shutter is disengaged from the U-shaped protrusion 85 of the pressing section 82. Accordingly, as shown in FIG. 10C, the pressing section 82 is separated from the disk 1 in accordance with the restoring force of the arm sections 84 of the pressing member 80. The disk 1 is supported by the spindle 200 of the driving unit in the cartridge 105.

The material for the arm sections 84 is not specifically limited, for which an arbitrary material may be used. For example, it is possible to use various metals, alloys, plastic materials, and ceramic materials. The material for the pressing section 82 is also not specifically limited. It is desirable that the protective material as described above is provided at the contact surface of the pressing section 82 to make contact with the disk 1. The arm sections 84 may be attached to the inner wall of the cartridge case by using an arbitrary method including, for example, integrated molding with the cartridge upper case, insert mold, adhesive, ultrasonic fusion, and rivet fixation. Alternatively, the arm sections 84 may be connected by being fitted to recesses formed in the inner wall of the case.

The pressing section 82 may be divided into two pieces in the vertical direction at the center so that the two pieces are supported by the two arm sections 84 respectively.

Sixth Embodiment

Figure 12A:
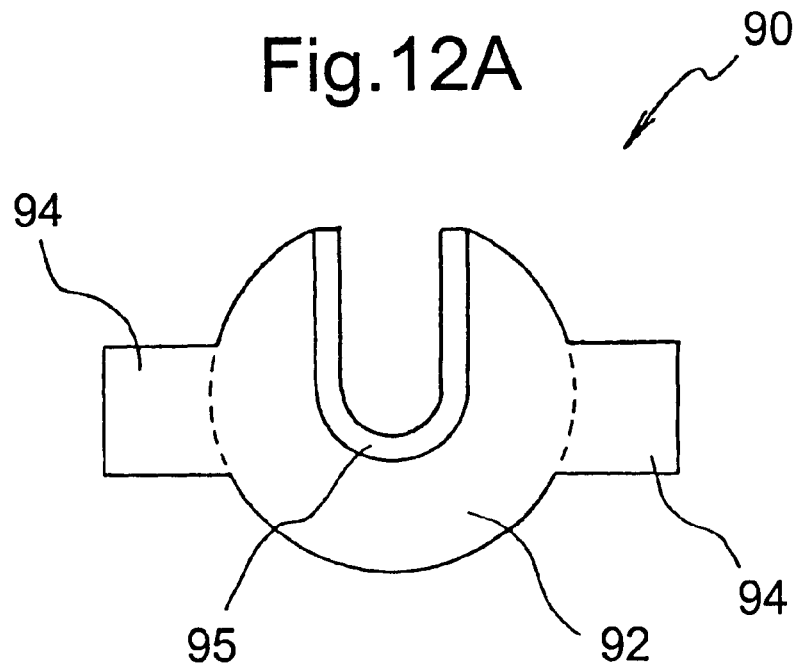
FIG. 12A illustrates a modified embodiment of the pressing member shown in FIG. 10A, which shows a plan view illustrating a pressing member comprising short arms and a pressing section having a large areal size as compared with the pressing member shown in FIG. 10A.
Figure 12B:
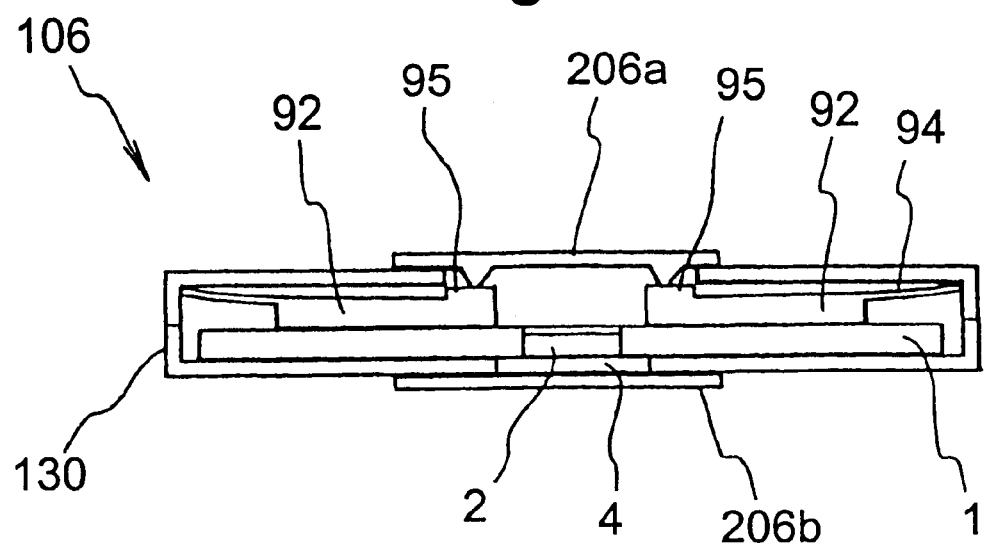
FIG. 12B shows a sectional view illustrating a cartridge provided with the pressing member as described above.

This embodiment is illustrative of a modified embodiment of the fifth embodiment, which will be explained with reference to FIGS. 12A and 12B. As shown in FIG. 12A, this modified embodiment resides in the use of a pressing member 90 which is provided with a pressing section 92 having a larger areal size in the radial direction of the disk and shorter arm sections 94, in place of the pressing member 80 used in the fifth embodiment. The other structure and the parts are the same as those of the cartridge 105 of the fifth embodiment. In the cartridge 106, the areal size of the pressing section 92 is larger than that of the cartridge of the fifth embodiment. Therefore, when the shutter is closed, the disk 1 can be pressed against the inner wall of the cartridge with a uniform force over a considerable area of the disk 1. Accordingly, even when the cartridge takes any posture, the disk 1 can be fixed in the cartridge 106 so that neither warpage nor deformation occurs.

Figure 13:
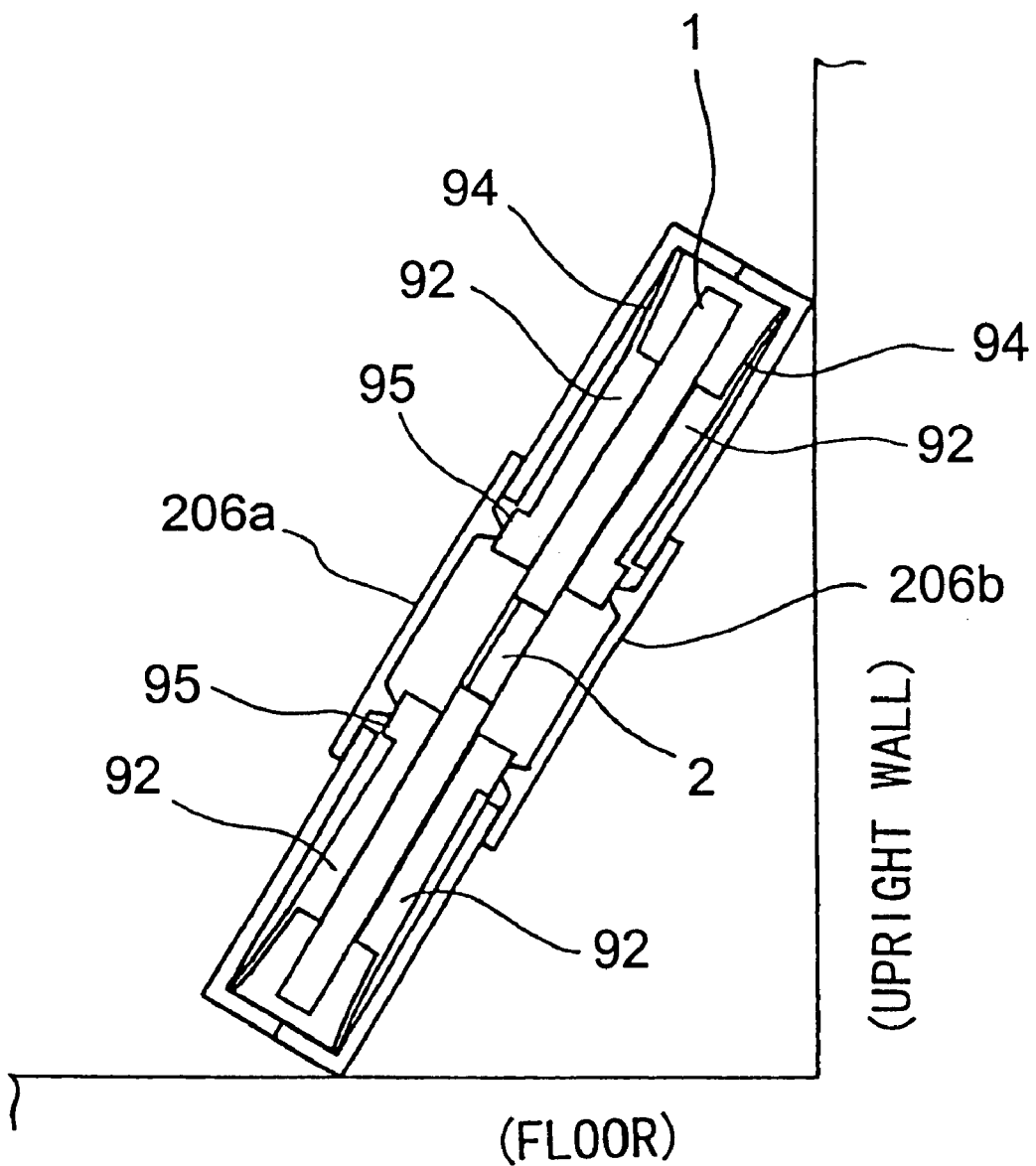
FIG. 13 schematically shows a cartridge comprising the pressing members shown in FIG. 12 which are provided on a side of an upper case and on a side of a lower case, illustrating a situation in which the cartridge is allowed to lean against a wall.

In this embodiment, the pressing member 90 supports the disk 1 at only its upper side. However, as shown in FIG. 13, a pair of pressing members 90 may be prepared to support the disk 1 at its both sides. FIG. 13 shows a situation in which a cartridge of this type is allowed to lean obliquely against the wall.

Seventh Embodiment

Figure 14A:
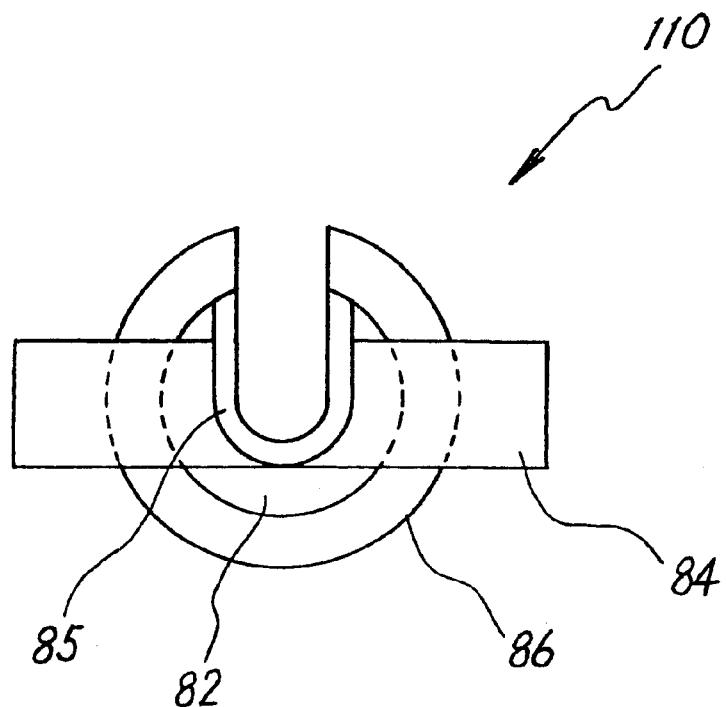
FIG. 14A illustrates a modified embodiment of the pressing member shown in FIG. 10A, which shows a plan view illustrating a pressing member provided with an annular and thin pressing plate.
Figure 14B:
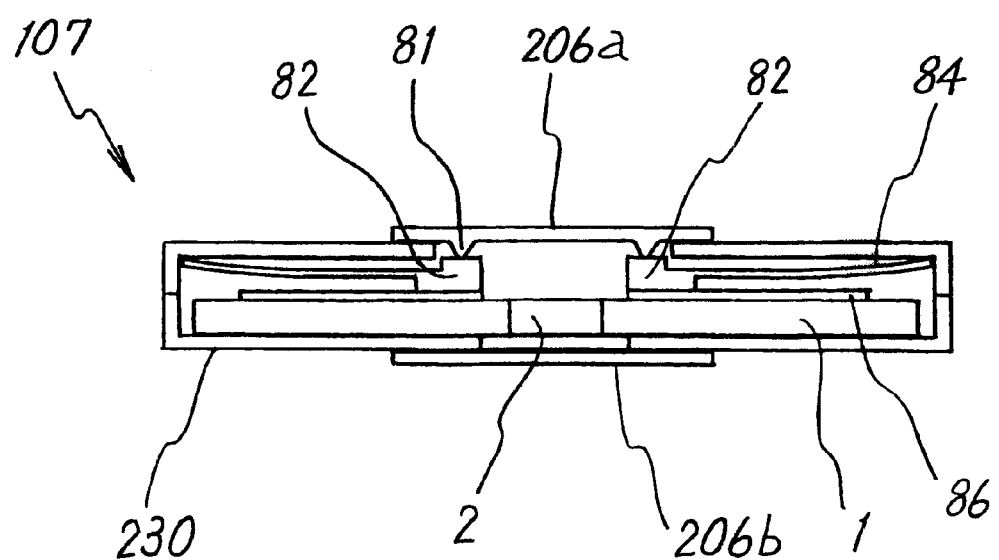
FIG. 14B shows a sectional view illustrating a cartridge provided with the pressing member as described above.

In this embodiment, another modified embodiment of the fifth embodiment will be explained with reference of FIGS. 14A and 14B. In the modified embodiment, a cartridge 107 is constructed in the same manner as in the fifth embodiment except that an annular and thin pressing plate 86 is provided at the contact surface of the pressing section 82 of the pressing member 80 as described in the fifth embodiment to make contact with the disk 1. The annular pressing plate 86 is concentric with the pressing section 82, and it has an areal size capable of substantially covering the recording area on the disk 1. Accordingly, when the shutter 206 is closed, the pressing plate 86 can be used to press the disk 1 against the inner wall of the cartridge case 230 with the pressing force which is uniform over the entire area of the disk 1. Thus, the disk 1 is fixed in the cartridge 107, and the flatness of the disk 1 is maintained in a well-suited manner, making it possible to avoid warpage and deformation. The cartridge 107 can have a weight which is lighter than that of the cartridge of the sixth embodiment.

The pressing plate 86 may be stuck with adhesive to the pressing section 82 on the side of the disk. Alternatively, the pressing plate 86 may be integrally formed with the pressing section 82. Those usable as the material for the pressing plate 86 include arbitrary materials such as metals, plastics, and ceramics. A rubber material or the protective material described above, which does not scratch the disk 1, may be formed on the surface of the pressing plate 86 on the side of the disk.

Also in this embodiment, the pressing member 110 supports only the upper side of the disk 1. However, a pair of pressing members 110 may be prepared to support the disk 1 at both sides.

Eighth Embodiment

Figure 15A:
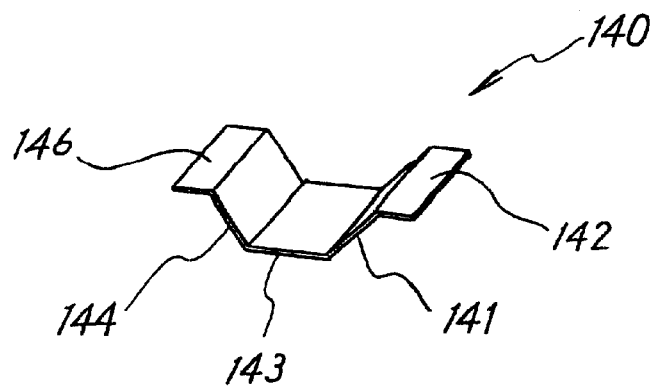
FIG. 15A shows a perspective view illustrating a plate spring having a shape different from the shape of the plate spring shown in FIGS. 1A to 1C.
Figure 15B:
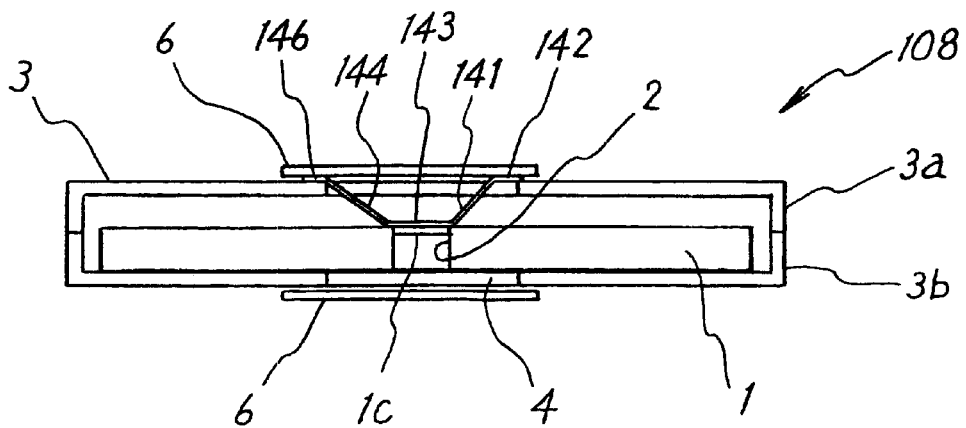
FIG. 15B shows a sectional view in which a situation of the plate spring having the shape as described above accommodated in a cartridge is viewed in a direction of Y—Y in a plan view corresponding to FIG. 1A.

This embodiment illustrates a modified embodiment of the first embodiment. The first embodiment is based on the use of the plate spring 30 comprising the support section 32, the arm section 31, and the pressing section 33 as shown in FIGS. 1A to 1C. However, in this embodiment, a plate spring 140 having a shape as shown in FIG. 15A is used in place of the plate spring 30. The plate spring 140 has a fixed support section 142, a movable support section 146, and a pressing section 143 disposed therebetween with intervening arm sections 141, 144 respectively. The plate spring 140 has the shape as shown in FIG. 15A when no external force is applied. FIG. 153 shows a situation in which the plate spring 140 is accommodated in the cartridge 108. The plan view of the cartridge 108 is approximately the same as FIG. 1A. FIG. 15B shows a sectional view, in which the cartridge 108 is viewed in a direction of Y—Y in a plan view corresponding to FIG. 1A.

The plate spring 140 functions as follows. That is, when the shutter 6 is closed as shown in FIG. 15B, then the fixed support section 142 is secured to the back side of the upper shutter plane of the shutter 6, and the pressing section 143 presses the hub 1C of the disk 1 downwardly. The movable support section 146 is pressed against the back side of the upper shutter plane by the aid of the restoring force exerted by the arm sections 141, 144. Since the pressing section 143 presses the hub 1C of the disk 1, the disk 1 is pressed against the inner wall of the lower case 3b of the cartridge 108. As a result, the disk 1 is immovably held in the cartridge case 3 regardless of the posture of the cartridge 108.

In this embodiment, the repulsive force, which is exerted by the disk 1 on the pressing section 143 of the plate spring 140 via the arm sections 141, 144, can be received by the fixed support section 142 and the movable support section 146. Therefore, the disk 1 can be immovably supported in the cartridge more tightly than in the first embodiment, regardless of the posture of the cartridge 108. Thus, it is possible to reduce metal fatigue of the plate spring 140, especially of bending sections thereof.

Figure 15C:
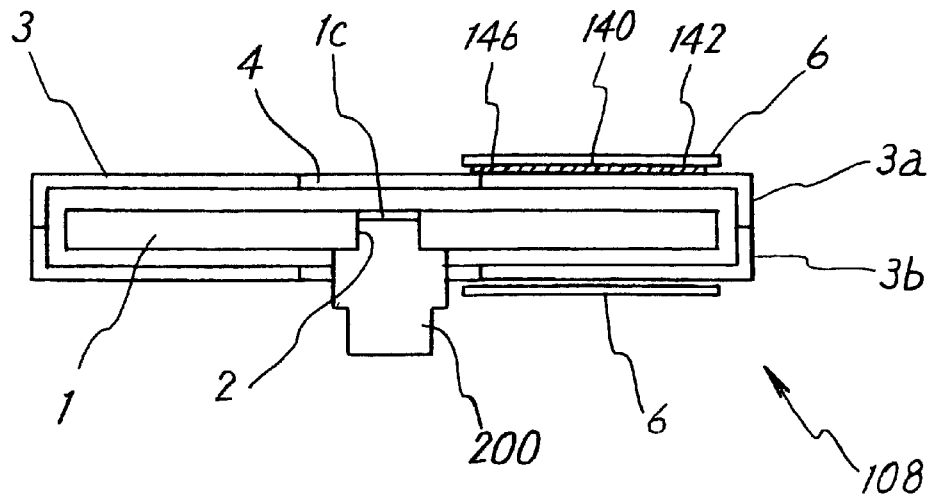
FIG. 15C shows a sectional view illustrating a state in which a shutter is open.

FIG. 15C shows a situation in which the cartridge 108 is installed to a driving unit, and the shutter 6 is open. When the shutter 6 is opened, then the arm section 141, the pressing section 143, the arm section 144, and the movable support section 146 of the plate spring 140 are retracted into the space between the upper shutter plane 6a of the shutter 6 and the upper case 3a of the cartridge 108, and they form a flat plate configuration.

Ninth Embodiment

Figure 16A:
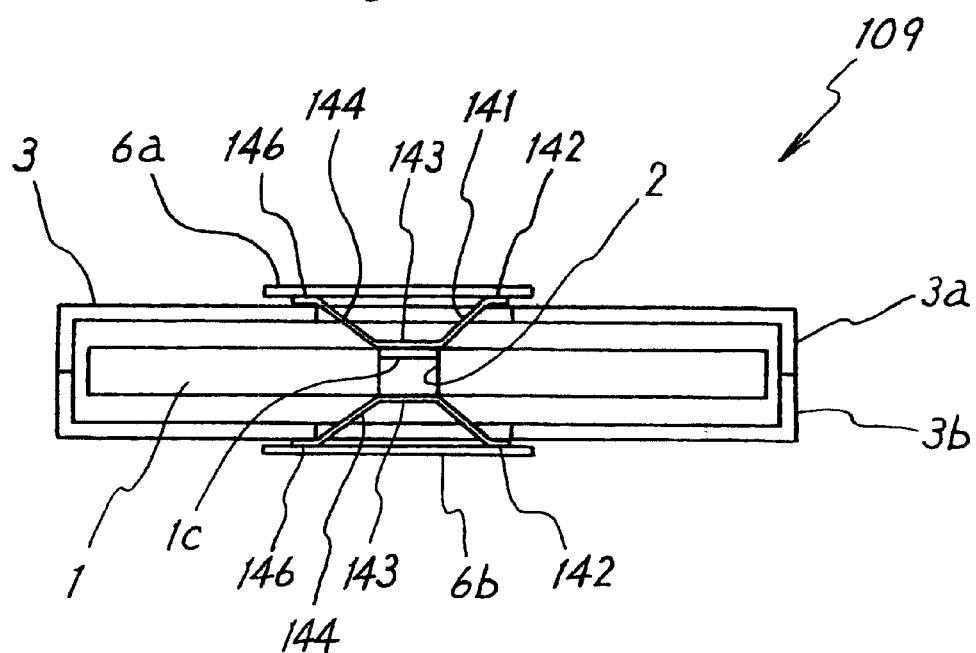
FIG. 16A shows a cross-sectional view in which a cartridge comprising the plate springs shown in FIG. 15A provided on a side of an upper case and on a side of a lower case of the cartridge respectively is viewed in a state in which a shutter is closed, in a direction of Y—Y in a plan view corresponding to FIG. 1A.
Figure 16B:
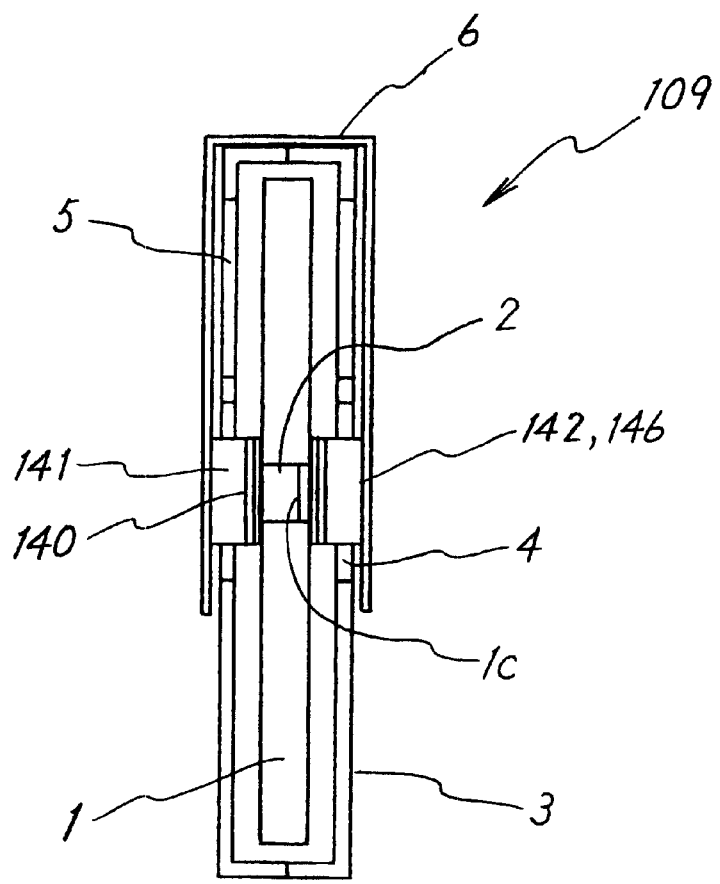
FIG. 16B shows a longitudinal sectional view in which the cartridge is viewed in a direction of X—X.

This embodiment illustrates a specified embodiment of a cartridge 109 in which the plate springs 140 as used in the eighth embodiment are provided on the side of the upper case 3a and on the side of the lower case 3b of the cartridge respectively. FIGS. 16A and 16B show sectional views as viewed in a direction of Y—Y and in a direction of X—X in a plan view corresponding to FIG. 1A respectively. The hub 1c of the disk 1 and the vicinity of the center hole 2 disposed on the opposite side are pressed by the pressing sections 143 of the respective plate springs 140. Thus, the disk 1 is immovably supported at the central position in the thickness direction in the cartridge 109.

Figure 17A:
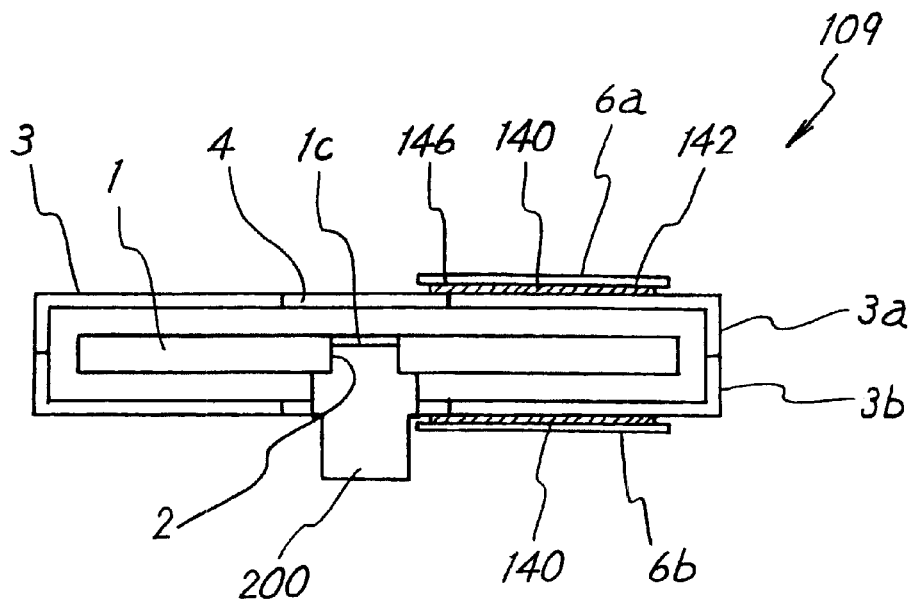
FIG. 17A shows a cross-sectional view illustrating the cartridge corresponding to FIG. 16A in a state in which the shutter is open.
Figure 17B:
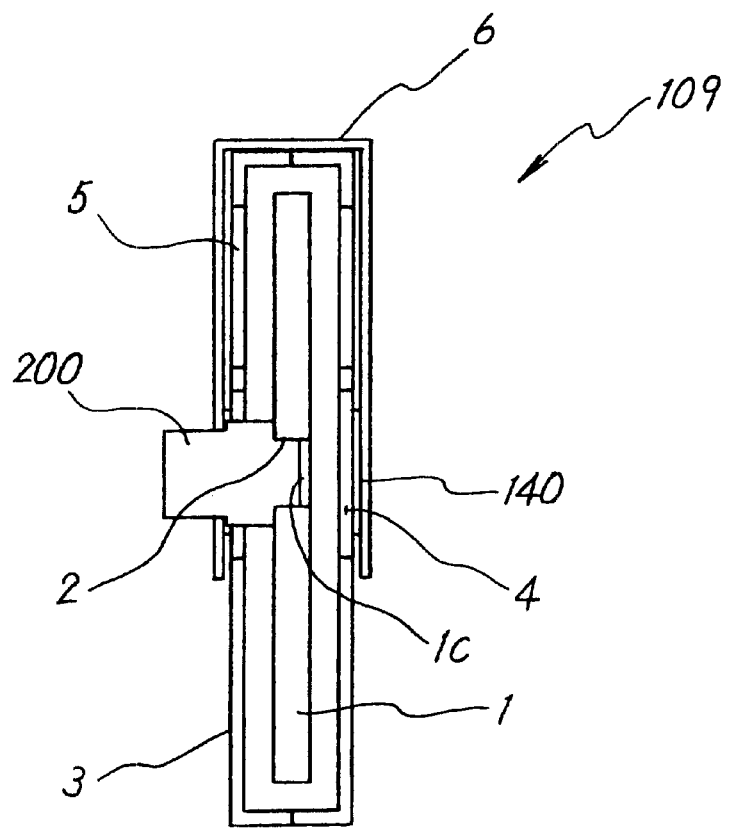
FIG. 17B shows a longitudinal sectional view illustrating the cartridge corresponding to FIG. 16B in the state in which the shutter is open.

FIGS. 17A and 17B show a state in which the shutter 6 is open, corresponding to FIGS. 16A and 16B respectively. The pair of plate springs 140 are retracted into the space between the upper shutter plane 6a of the shutter 6 and the upper case 3a and into the space between the lower shutter plane 6b and the lower case 3b, and they give planar configurations.

Tenth Embodiment

Figure 18A:
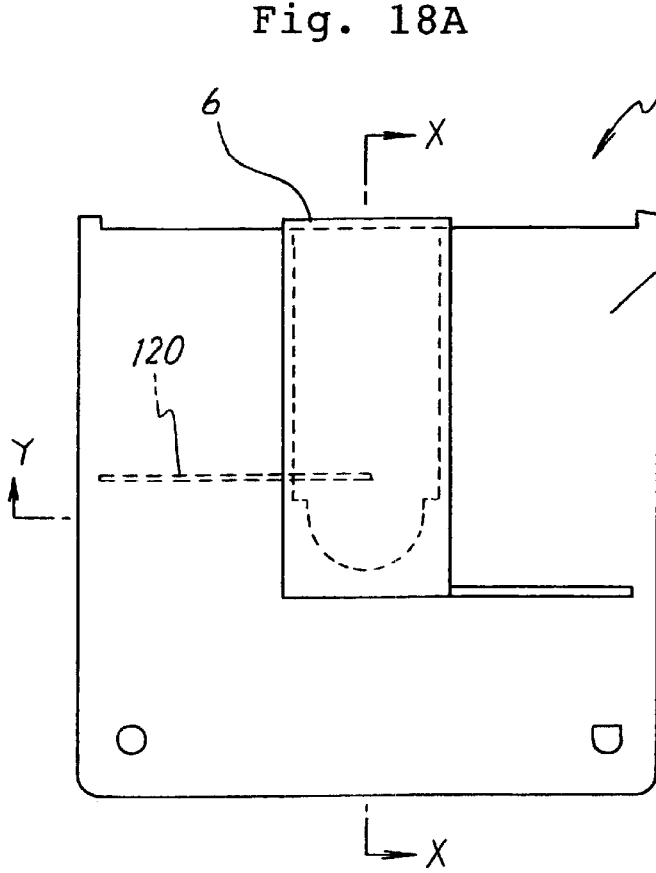
FIG. 18A shows a plan view illustrating a cartridge comprising a wire spring which is used in place of the plate spring in a state in which a shutter is closed.
Figure 18B:
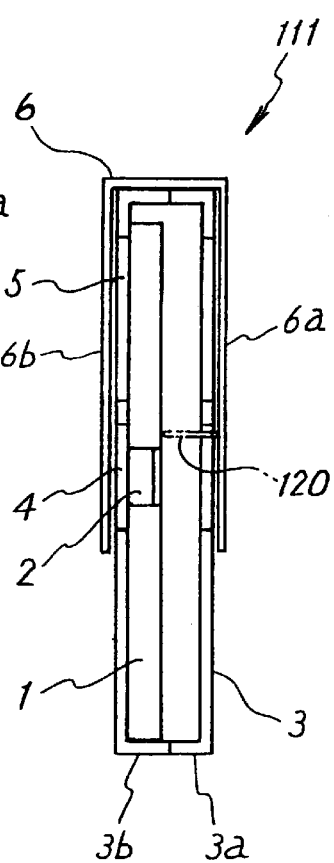
FIG. 18B shows a longitudinal sectional view in which the cartridge is viewed in a direction of X—X.
Figure 18C:
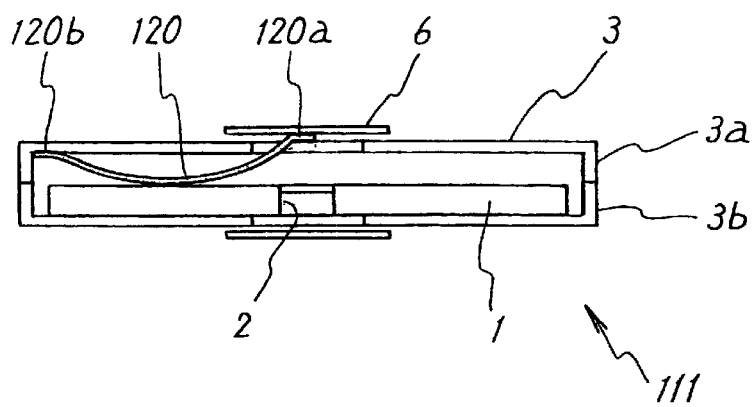
FIG. 18C shows a cross-sectional view in which the cartridge is viewed in a direction of Y—Y.

In this embodiment, a wire spring is used in place of the plate spring 30 used in the first embodiment. A state, in which the shutter 6 of a cartridge 111 of this embodiment is closed, is shown in FIG. 18A which is a plan view, in FIG. 18B which illustrates a sectional view taken along a direction of X—X, and in FIG. 18C which illustrates a sectional view taken along a direction of Y—Y. One end 120a of the wire spring (piano wire, i.e., steel wire) 120 is secured to the back surface of the upper shutter plane 6a of the shutter 6. The other end 120b of the wire spring 120 is secured to a portion in the vicinity of the end of the inner wall of the upper case 3a of the cartridge 111. As shown in FIG. 18C, the wire spring 120 is curved downwardly in a state in which the shutter 6 is closed. The curved section contacts with the disk 1 to press the disk 1 against the inner wall of the lower case 3b. Accordingly, even when the cartridge 111 takes any posture, then the disk 1 is fixed in the cartridge 111, and no load is partially exerted on the disk 1. When the cartridge 111 is depicted as viewed in FIG. 18B, the wire spring 120 cannot be seen actually. However, the wire spring 120 is depicted by using a phantom line for the purpose of explanation.

Figure 19:
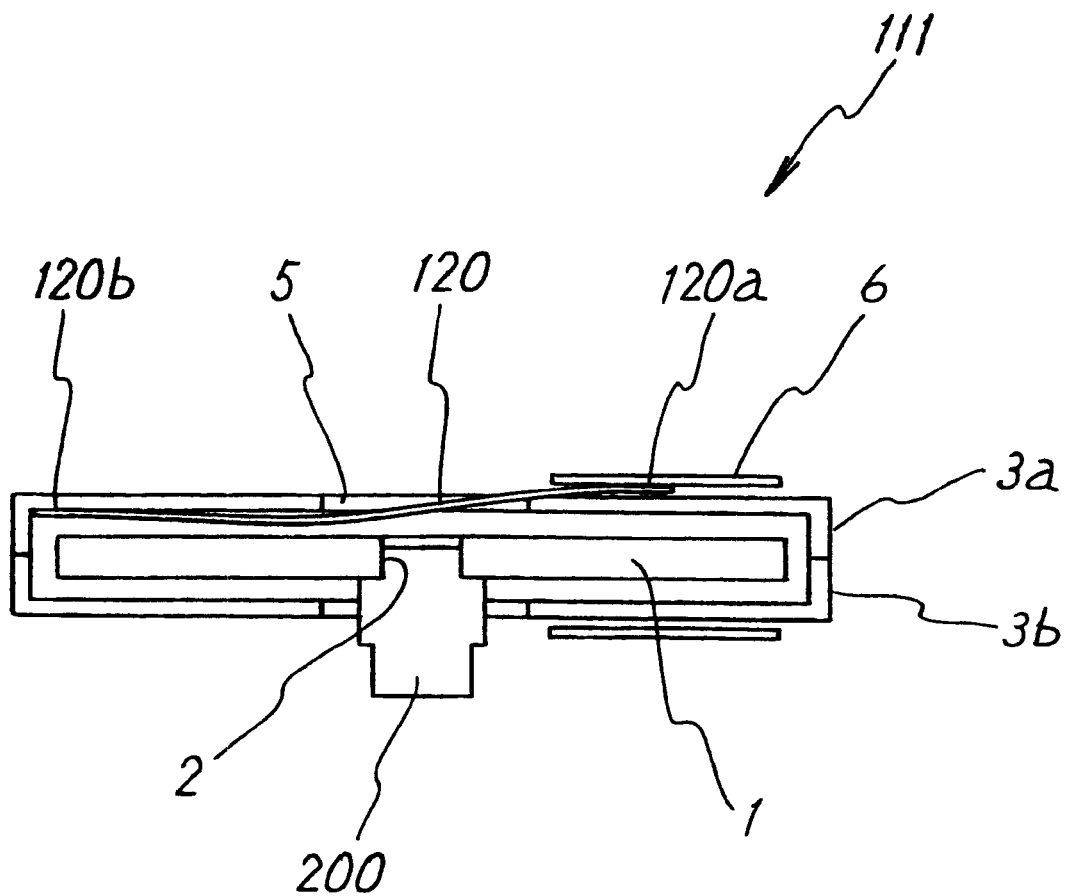
FIG. 19 schematically shows a state of the cartridge shown in FIGS. 18A to 18C installed to a driving unit in which the shutter is open.

FIG. 19 shows a state in which the shutter 6 is open when the cartridge 111 is installed to a driving unit. When the shutter 6 is opened, one end 120a of the wire spring 120 is separated from the other end 120b. Accordingly, the wire spring 120 is straightened, and it does not make contact with the disk 1.

The wire spring 120 is used after being coated with polytetrafluoroethene so that the surface of the disk 1 is not scratched. A wire material made of an arbitrary material may be used for the wire spring 120. For example, the wire spring 120 may be composed of various metals, alloys, plastics, and ceramics. It is preferable to use a material which undergoes less fatigue due to elastic deformation.

In this embodiment, the wire spring 120 is used in the vicinity of the spindle hole 4. However, as shown in FIGS. 20A and 20B, a wire spring 125 may be provided at a position at which the wire spring 125 passes through a central portion of the window 5. Alternatively, a plurality of wire springs may be provided. For example, the wire springs 120, 125 may be provided at the two positions shown in FIGS. 18A and 20A respectively.

Eleventh Embodiment

Figure 21A:
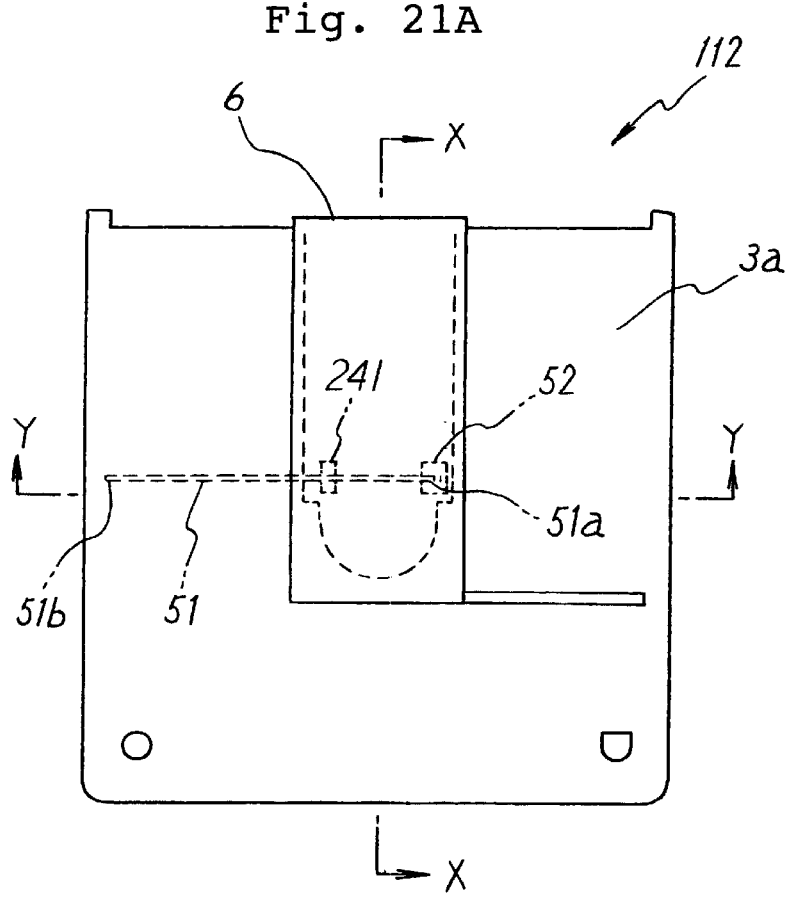
FIG. 21A shows a plan view illustrating a cartridge based on the use of a wire spring having a central convex bent section in place of the wire spring shown in FIGS. 18A to 18C.
Figure 21B:
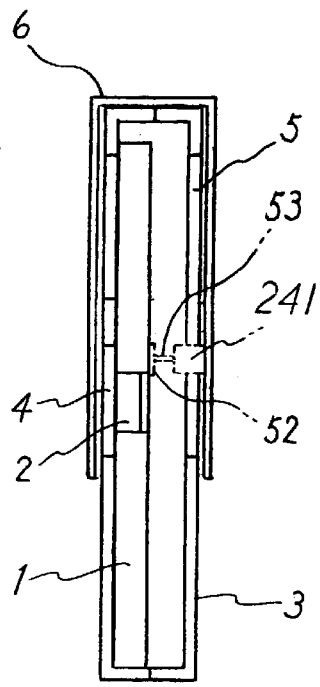
FIG. 21B shows a longitudinal sectional view in which the cartridge is viewed in a direction of X—X.
Figure 21C:
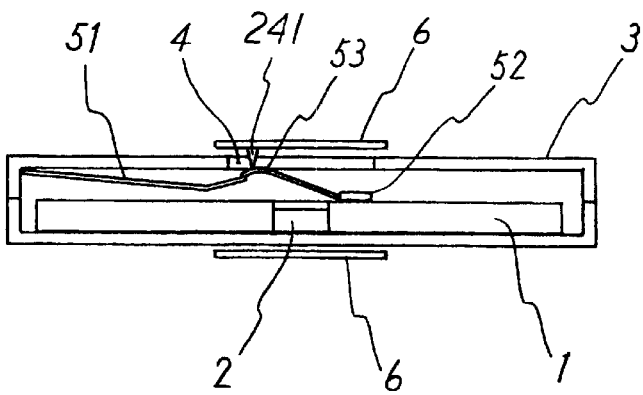
FIG. 21C shows a cross-sectional view in which the cartridge is viewed in a direction of Y—Y.

This embodiment illustrates a cartridge 112 based on the use of a wire spring 51 which has a shape as shown in FIGS. 21A to 21C and FIG. 22. A pressing plate 52 is secured to one end 51a of the wire spring 51, and the other end 51b is secured to the vicinity of the end of the inner wall of the upper case 3a of the cartridge 112. The wire spring 51 is shaped to have a convex bent section 53 at a central portion of the wire spring 51. A projection 241 protrudes toward the cartridge 112 on the upper shutter plane 6a of the shutter 6. As shown in FIG. 21C, when the shutter 6 is closed, the projection 241 on the upper shutter plane 6a presses the convex bent section 53 of the wire spring 51 toward the disk 1. Therefore, the pressing section 52 presses the disk 1, and the disk 1 is pressed by the pressing force against the inner wall of the lower case 3b. Accordingly, even when the cartridge 112 takes any posture, the disk 1 is immovably supported in the cartridge 112. No load is partially exerted on the disk 1 in the supported posture.

Figure 22:
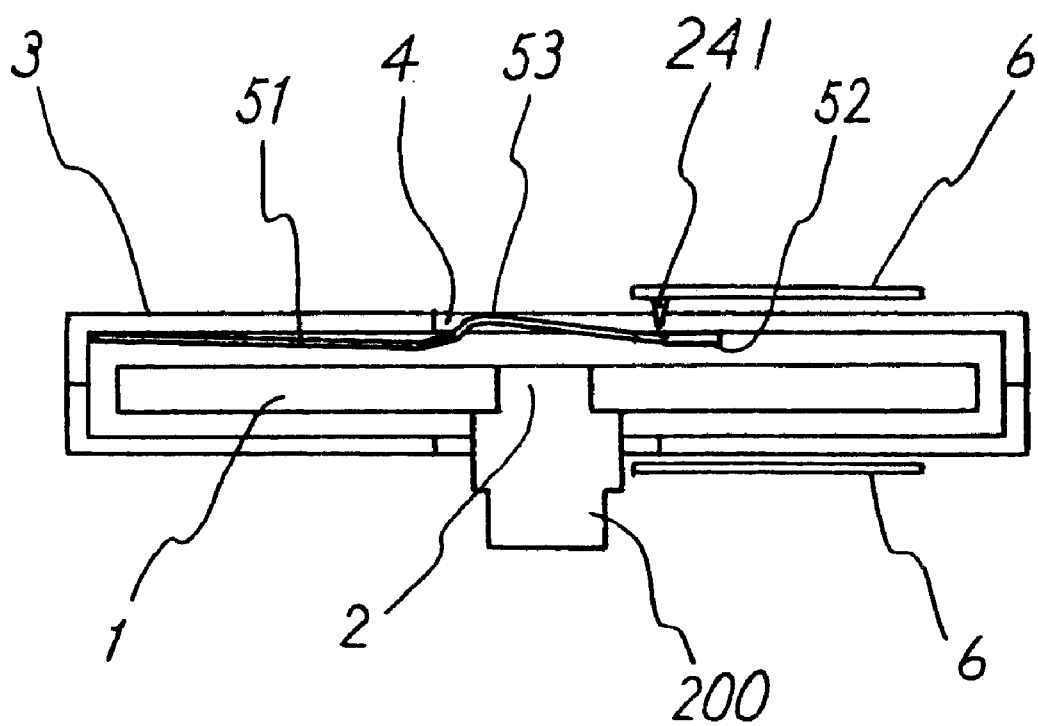
FIG. 22 shows a cross-sectional view in which a state of the cartridge shown in FIGS. 21A to 21C with its open shutter is viewed in the direction of Y—Y in a plan view corresponding to FIG. 21A.

FIG. 22 shows a state in which the shutter 6 is open when the cartridge 112 is installed to a driving unit. When the shutter 6 is opened, the projection 241 disposed on the upper shutter plane 6a is separated from the convex bent section 53 of the wire spring 51. Accordingly, the wire spring 51 is moved upwardly in accordance with the restoring force of the wire spring 51, and the convex bent section 53 is exposed from the spindle hole 4. As a result, the pressing plate 52 no longer presses the disk 1, and the disk 1 is supported by only the spindle 200 in the cartridge 112.

The surface of the pressing plate 52 to make contact with the disk 1 is coated with a material such as neoprene rubber which does not scratch the surface of the disk 1 even when the disk 1 is contacted and rubbed with the surface of the pressing plate 52. The material for the wire spring 51 may be an arbitrary material in the same manner as in the tenth embodiment.

Twelfth Embodiment

Figure 23A:
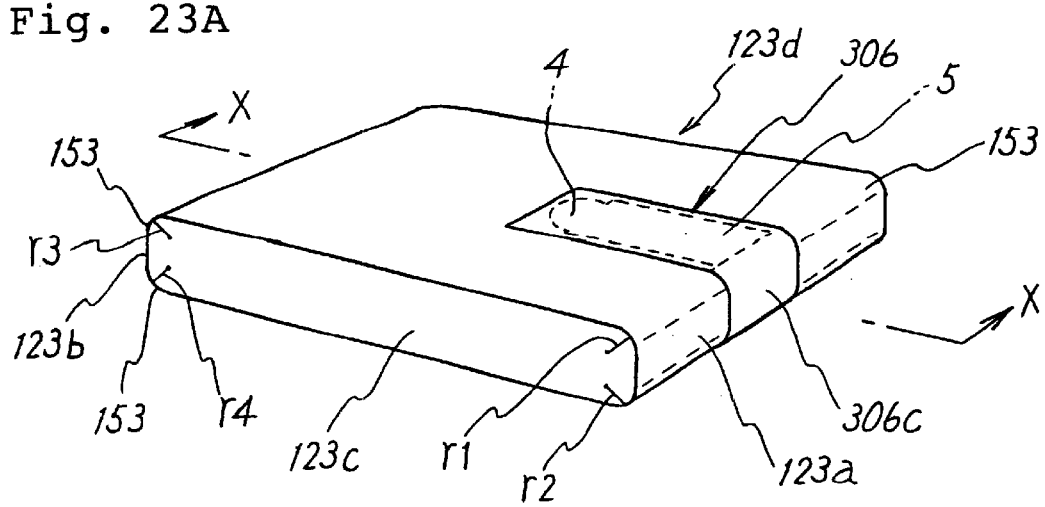
FIG. 23A shows a perspective view illustrating a cartridge according to a twelfth embodiment.
Figure 23B:
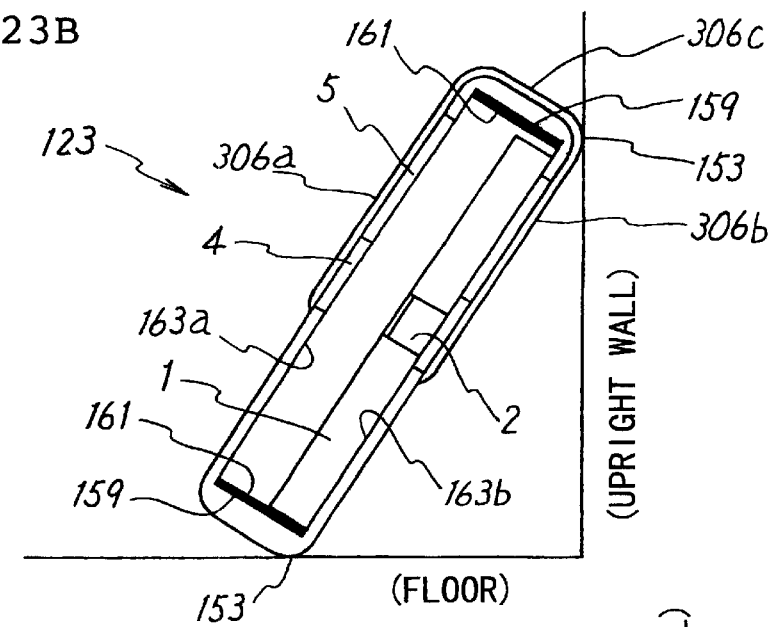
FIG. 23B shows a sectional view in which a situation of the cartridge shown in FIG. 23A allowed to lean against a wall is viewed in a direction of X—X shown in FIG. 23A.
Figure 23C:
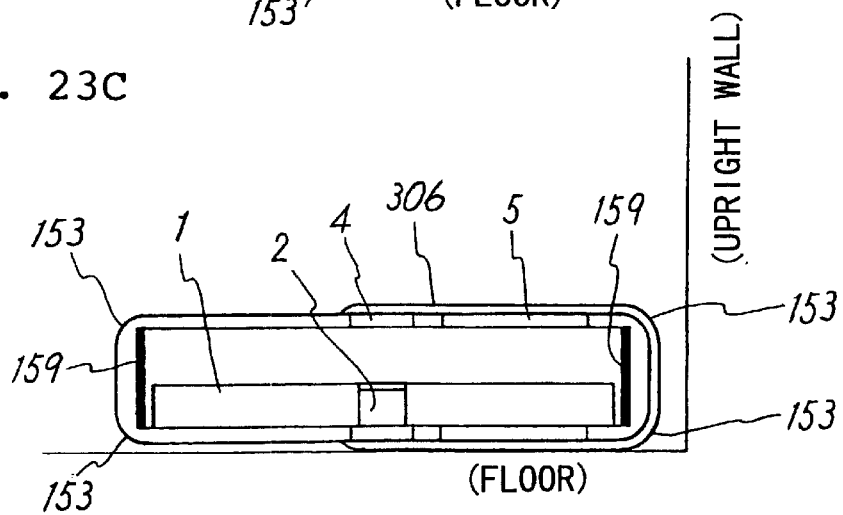
FIG. 23C shows a sectional view illustrating the cartridge having slipped down from the wall and lain on the floor, in which the cartridge is viewed from the direction of X—X shown in FIG. 23A.
Figure 25B:
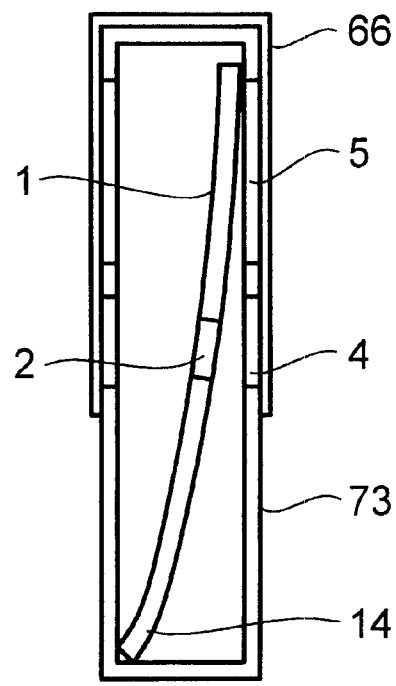
FIG. 25B shows a situation in which the warpage deformation occurs in a disk accommodated in a cartridge case when the cartridge is thereafter left to stand perpendicularly.

FIGS. 23A to 23C conceptually show a cartridge according to still another embodiment of the present invention. Two of four side surfaces (side surfaces having relatively narrow widths) of a cartridge 123 are formed as follows. That is, long sides (ridges) of a side surface 123a which is partially covered with a connecting section 306c of a shutter 306, and of a side surface 123b which is opposed to the side surface 123a are chamfered respectively to form four curved surfaces 153. Accordingly, as shown in FIG. 23B, when the cartridge 123 is allowed to lean against the wall, the cartridge 123 contacts with the floor and the wall at the curved surfaces 153. Since the curved surface 153 is curved, its frictional resistance is extremely lower than those of the long sides (ridges or edges) of the conventional cartridge as show in FIGS. 25A and 25B. Therefore, the cartridge 123 easily slips down from the wall, and it lies on the floor as shown in FIG. 23C. As a result, the disk 1 accommodated in the cartridge 123 is uniformly placed on one of the flat inner walls (on the inner wall of the lower case) of the cartridge 123. Thus, warpage or flexure hardly occurs.

It is desirable that the curved surface 153 is adjusted to have its curvature r (depicted as r1 to r4 in FIG. 23A) of not less than 2 mm, in view of the fact that the cartridge 123 is prevented from being allowed to stand perpendicularly on the floor with its side surface located at the bottom, and from being maintained in a leaning posture against the wall as shown in FIG. 23B. The connecting section 306c of the shutter 306 is also processed to have a shape corresponding to the curved surface 153.

In this embodiment, the long sides of the opposing side surfaces 123a, 123b are chamfered to form the curved surfaces 153. In place of this procedure or in addition to this procedure, long sides of the other opposing side surfaces 123c, 123d may be chamfered to form curved surfaces 153 in the same manner as described above.

In order to avoid any remaining flat portion on the side surface 123a, it is also possible that the side surface 123a itself is a curved surface. For example, it is preferable that the curvature of the side surface is not less than 2 mm. Alternatively, it is also preferable to form a curved surface having a curvature corresponding to a half of the thickness of the cartridge 123 or a curvature larger than it. When at least one of the side surfaces 123a to 123d, or preferably all of them are formed into the curved surfaces as described above, it is impossible to allow the cartridge to stand perpendicularly with the curved surface contacting with the floor or ground. It is also difficult to allow the cartridge to lean against the wall. The curved configuration as described above also has a function to visually appeal to the user such that the cartridge 123 should be arranged to be laid down.

According to still another embodiment of the present invention, the cartridge 123 is formed with a coating layer 159 composed of a material (sliding material) which causes smooth sliding movement on the four side walls 161 of the inner walls for surrounding the outer circumference of the disk 1. When the cartridge 123 is inclined in a state as shown in FIG. 23B, then the disk 1 slides on the coating layer 159, and it is moved to slip down toward the inner flat surface 163b disposed at a lower position, of the inner flat surfaces 163a, 163b of the cartridge 123. Accordingly, even when the cartridge 123 is left to lean against the wall in the state as shown in FIG. 23B, the disk 1 is supported by the entire inner flat surface 163b disposed at the lower position. Therefore, no deflected force is exerted on the disk 1. Thus, the disk 1 hardly suffers from deformation such as warpage and flexure.

Those usable as the sliding material for the coating layer 159 include materials on which the disk 1 causes sliding movement smoother than on the material used for the inner wall of the cartridge. Those usable as the sliding material include, for example, titanium nitride composed of (resin layer+nickel phosphorus compound layer+titanium layer+ titanium nitride layer), silicon dioxide, silicon monoxide, aluminum oxide, silicon carbide, silicon nitride, nitrogen carbide, aluminum nitride, aluminum carbide, diamond-like carbon, and phosphosilicate glass.

Thirteenth Embodiment

Figure 24A:
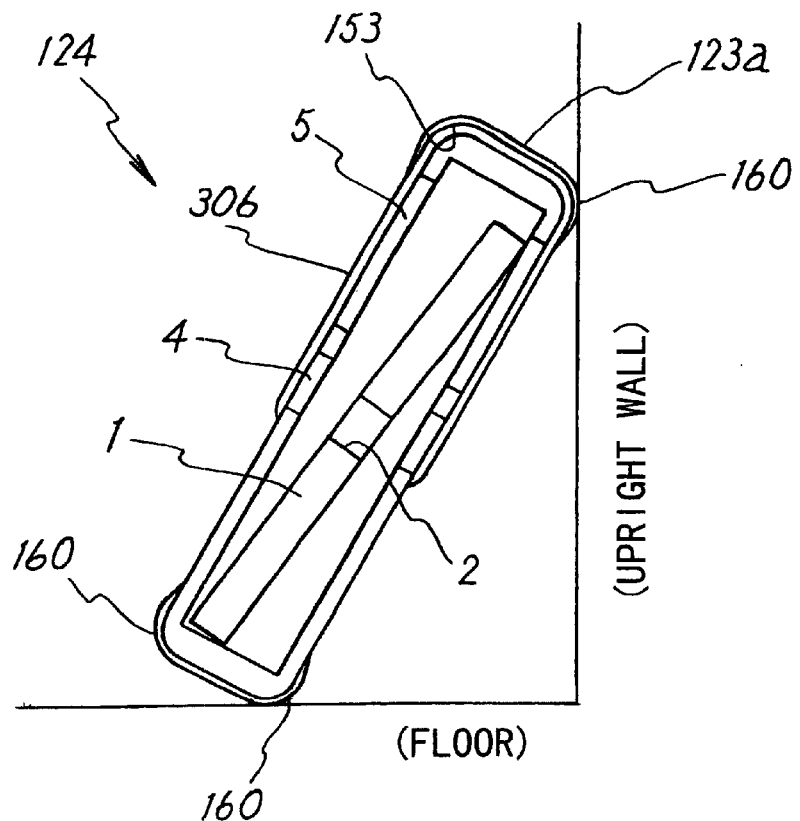
FIG. 24A shows sectional view as viewed in the direction of X—X shown in FIG. 23A, illustrating a situation in which a coating layer 160 is provided on a chamfered side surface of the cartridge according to the twelfth embodiment to provide a cartridge which is allowed to lean against a wall.
Figure 24B:
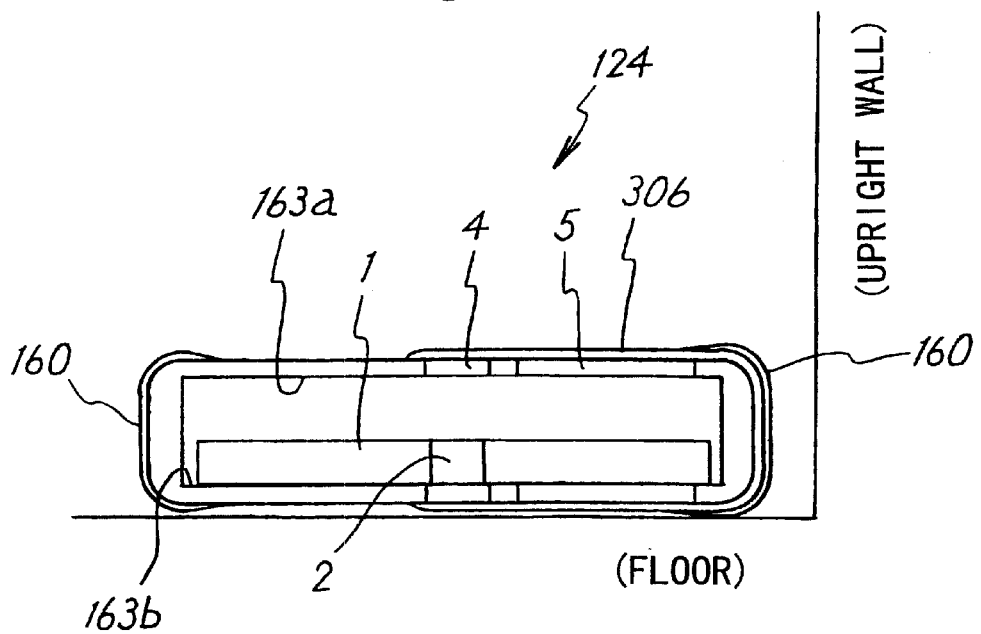
FIG. 24B shows a sectional view illustrating the cartridge having slipped down from the wall and lain on the wall, in which the cartridge is viewed in the direction of X—X shown in FIG. 23A.

A cartridge of this embodiment will be explained with reference to FIGS. 24A and 24B. The cartridge 124 shown in FIG. 24A is obtained as follows. That is, the side surfaces 123a, 123b chamfered and formed with the curved surfaces 153 of the cartridge 123 of the twelfth embodiment are coated with the same sliding material having the small coefficient of friction as the material for the coating layer 159 used in the twelfth embodiment to form coating layers 160. When nickel bright plating is used as another material applicable to the coating layer 160, it is possible to increase not only the sliding performance but also the mechanical strength. A resin such as nylon, polyacetal, and polytetrafluoroethylene may be used at low cost.

The same coating layer 160 is also formed on the connecting section 306c of the shutter 306. Accordingly, even when the cartridge 124 is allowed to lean against the wall in a posture as shown in FIG. 24A, the cartridge 124 tends to fall down as shown in FIG. 24B, because of the small frictional resistance of the contact portion of the coating layer 160 with respect to the floor and the wall. When the cartridge 124 falls down as shown in FIG. 24B, the disk 1 accommodated therein is supported by the lower inner wall surface of the cartridge over its entire area. Therefore, flexure and warpage scarcely occur.

This embodiment is illustrative of application of the coating layer 160 to the cartridge in which the long sides (ridges) of the side surfaces shown in the twelfth embodiment are chamfered. However, the present invention is not limited thereto. For example, the coating layer 160 may be applied to a cartridge in which no side surface is chamfered, for example, to a conventional cartridge as shown in FIG. 25 so that a curved surface 153 having a curvature as defined in the twelfth embodiment is formed.

The cartridge according to the present invention has been specifically explained above with reference to the embodiments. However, the present invention is not limited thereto. It is possible to adopt various materials, dimensions, and structures. For example, the size and the dimension of the cartridge case may be appropriately changed. The spindle hole or the window may be formed on only one side of the case. The shape and the position of the window are also not limited to those illustrated for the cartridges described in the embodiments, for which it is possible to adopt arbitrary shapes and positions.

The plate spring and the wire spring used in the embodiments are not limited to those composed of the exemplified materials, which may be formed of shape memory members such as shape memory alloys. The information-recording medium accommodated in the cartridge has been explained as exemplified by the magneto-optical disk. However, there is no limitation thereto. It is possible to use arbitrary information-recording media such as phase-change optical recording disks, magnetic disks, read-only type optical disks (CD, CD-ROM), digital versatile disks (DVD or DVD-ROM), write-once type optical disks (Write-Once type or CD-R), removable hard disks, hard disks, and magnetic cards. The dimension of the disk is not limited to 1.8 inches, 2.5 inches, 3.5 inches, 5.25 inches, and 12 inches, which may be an arbitrary dimension.

The essential characteristics of the invention, which are applied to the embodiments described above, may be appropriately combined to construct a cartridge. The studs and the ribs as shown in FIG. 3 may be provided on the inner wall surface of the cartridge for any of the cartridges according to the embodiments described above. The position and the size of the stud and the rib may be appropriately changed. However, in the case of the cartridge of the type in which the disk is pressed against the inner wall of the cartridge by the aid of the pressing section, of the cartridges as shown in the first to eleventh embodiments, it is desirable that the ribs and the studs are provided uniformly to have a substantially identical height so that the disk may be supported over its entire surface.

The cartridge of the present invention makes it possible to immovably hold the accommodated information-recording medium in the cartridge by urging the information-recording medium by means of the pressing member or the elastic member in the state in which the shutter of the cartridge is closed. Accordingly, the information-recording medium is prevented from movement in the cartridge to avoid the posture which tends to cause deformation such as warpage and flexure. Since the information-recording medium cannot be moved in the cartridge, the information-recording medium is also prevented from damage which would be otherwise caused by collision with the inner wall of the cartridge. Especially, the elastic member contacts with the information-recording medium accommodated in the cartridge case, and it presses the information-recording medium against the inner wall of the cartridge case. Accordingly, no partial load is applied to the outer circumferential portion of the information-recording medium. Even when the cartridge is arranged perpendicularly or obliquely for a long period of time in an environment of high temperature and high humidity, it is possible to suppress occurrence of deformation due to warpage and flexure in the information-recording medium.

When the shutter is open, the elastic material can be retracted into the space between the shutter and the cartridge case. Accordingly, no influence is exerted at all on the function of the cartridge and on the recording and reproducing operations on the disk accommodated in the cartridge. Therefore, the cartridge of the present invention is extremely effective for the high density recording medium based on the use of a thin substrate.

Owing to the shape of the side surface or the presence of the sliding material, the cartridge of the present invention avoids the occurrence of arrangement of being allowed to stand perpendicularly or lean against the wall, which would be otherwise bring about the deformation of the recording medium.

What is claimed is:

1. A cartridge with surfaces and a groove therein for accommodating an information-recording medium, comprising:

a cartridge case having two sides on which a window for accessing the information-recording medium in the cartridge by a recording and/or reproducing head is formed;

a shutter for opening and closing the window, the shutter having a projection provided on an inner surface; and an elastic deformable pressing member supported in the cartridge case to be capable of elastic deformation, for being urged by the projection to press the information-recording medium so that the information-recording medium is fixed in the cartridge case when the shutter is closed, wherein the pressing member is disengaged from the information-recording medium when the shutter is open.

2. The cartridge according to claim 1, wherein when the shutter is closed, the pressing member contacts with the information-recording medium accommodated in the cartridge case to press the information-recording medium against an inner wall of the cartridge case so that the information-recording medium is fixed in the cartridge case.

3. The cartridge according to claim 1, wherein a groove, into which the projection is inserted to slide therein when the shutter is opened, is formed on the cartridge case.

4. The cartridge according to claim 1, wherein the pressing member comprises a pressing section for pressing the information-recording medium, and an arm for movably supporting the pressing section in the cartridge case.

5. The cartridge according to claim 4, wherein the pressing section is supported between a pair of arms, and the pressing section has a pressing surface for pressing the information-recording medium and a contact surface disposed on a side opposite to the pressing surface, for making contact with the projection.

6. The cartridge according to claim 4, wherein the information-recording medium is disk-shaped, and the pressing section is annular.

7. The cartridge according to claim 6, wherein the pressing section has an areal size which substantially covers a disk surface.

8. The cartridge according to claim 4, further comprising an annular pressing plate for covering a disk surface, the annular pressing plate being attached to the pressing section.

9. The cartridge according to claim 4, wherein an opening for engaging with the pressing section is formed at a central portion of the cartridge case, and the pressing section engages with the opening when the shutter is open.

10. The cartridge according to claim 4, wherein one end of the arm is secured to an inner wall of the cartridge case, the other end of the arm is coupled to the pressing section, a part of the arm is bent to form a protrusion which is convex toward the outside of the cartridge case, and the pressing member is urged by the projection when the shutter is closed.

11. The cartridge according to claim 1, wherein the window includes a pair of window openings which are formed through each of the surfaces of the cartridge case so that the information-recording medium is accessible from either side of the cartridge case, the shutter includes a pair of shutter planes for opening and closing the pair of window openings, a projection is provided on each of the inner surfaces of the shutter planes, a pressing member is provided on each side of the information-recording medium, and thereby the information-recording medium is interposed and fixed between a pressing member in the cartridge case.

12. The cartridge according to claim 1, wherein the information-recording medium is contained at an inside of the cartridge case.

13. The cartridge according to claim 1, wherein the information-recording medium comprises a plastic substrate.

14. The cartridge according to claim 1, wherein the information-recording medium comprises a plastic substrate.

* * * * *